United States Patent [19]

Okamoto et al.

[11] Patent Number: 5,502,461

[45] Date of Patent: Mar. 26, 1996

[54] HAND WRITTEN CHARACTER INPUT SYSTEM/ALLOWING CHANGE OF SIZE OF CHARACTER WRITING FRAMES

[75] Inventors: Masayoshi Okamoto; Takatoshi Yoshikawa; Kazuhiro Ieda; Hiroshi Horii, all of Gifu, Japan

[73] Assignee: Sanyo Electric Co., Ltd., Moriguchi, Japan

[21] Appl. No.: 224,867

[22] Filed: Apr. 8, 1994

[30] Foreign Application Priority Data

May 11, 1993 [JP] Japan .................................. 5-109437

[51] Int. Cl.⁶ .................................................... G09G 5/00
[52] U.S. Cl. ............................ 345/173; 345/156; 382/187
[58] Field of Search .................................... 345/156, 173, 345/143; 382/13

[56] References Cited

U.S. PATENT DOCUMENTS 5,191,622  3/1993  Shojima ..................................... 382/13
5,267,327  11/1993  Hirayama .

FOREIGN PATENT DOCUMENTS 61-243581  10/1986  Japan .

5-66765  9/1993  Japan .

OTHER PUBLICATIONS

Microsoft Windows Version 3.1, 1985–1992.

Primary Examiner—Richard Hjerpe
Assistant Examiner—Kent Chang
Attorney, Agent, or Firm—Armstrong, Westerman, Hattori, McLeland & Naughton

[57] ABSTRACT

On a liquid crystal display panel of the handwritten character input system, a data input frame is displayed, and in the data input frame, a plurality of character writing frames are displayed. Each of the character writing frames defines an area to which a handwritten character can be input. In a frame number changing mode, when the size of the data input frame is changed, the number of character writing frames is changed in accordance with the change size. In a frame size changing mode, when the size of the data input frame is changed, the size of the character writing frame is changed in accordance with the changed size. Further, when the size of the character writing frame is changed, the character font to be displayed is also changed in accordance with the changed size.

5 Claims, 29 Drawing Sheets

FIG.18A
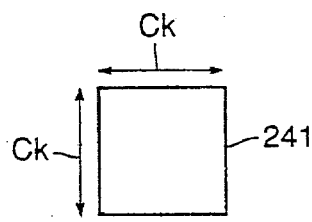
FIG.18B
| FONT NAME | FONT / FONT SIZE |
|---|---|
| FONT S | CfSK<br>A — CfS |
| FONT M | CfMK<br>A — CfM |
| FONT L | CfLK<br>A — CfL |
FIG.18C
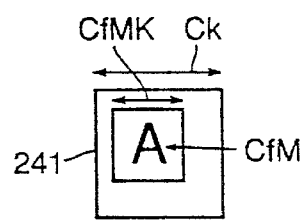

HAND WRITTEN CHARACTER INPUT SYSTEM/ALLOWING CHANGE OF SIZE OF CHARACTER WRITING FRAMES

BACKGROUND OF THE INVENTION

1. Field of the Invention

The present invention relates to a hand written character input system, and more particularly, to a handwritten character input system allowing change of size of character writing frames.

2. Description of the Background Art

Keyboards and mouses are known a dominant input devices for conventional computer systems such as a document processor. However, operation of these devices are not natural human operation, and therefore it takes time and labor to be accustomed to such operation.

A system in which the user can designate a position by means of a pen, or in which writing of the user by a pen can be recognized and input has been attracting attention as means to solve the above described problem. Such system is generally configured as to allow the user to write characters one by one on a character writing frame.

Also, there has been proposed a system including a plurality of character writing frames, to which plurality of character writing frames the user write characters, the result of recognition is edited on the character writing frames (for example, correction, insertion or deletion is effected), and the character train is fed to the computer.

Though such systems are used in various opportunities by various users, the number and size of the character writing frames are fixed in the conventional system. This is one reason why the conventional system for handwritten character input is not very convenient.

For example, for a user having weak eye sight, larger character writing frame is preferred since it allows easier writing and easier confirmation of the hand writings and displays. On the contrary, if the size of the character writing frame is too large, the displayed character writing frame may be overlapped with other displays such as sentences and items, hindering smooth operation.

Meanwhile, if only a small number of characters are to be input, for example, when an item or heading is to be input, smaller number of character writing frames is preferred. When a large number of characters are to be input, for example, sentences are to be input, larger number of character writing frames is preferred. However, if the number of character writing frames is too large, the display space for the character writing frames may hinder smooth operation.

As described above, since the number and size of the character writing frames are fixed in the conventional handwritten character input system, for some users or some display screen, it is not very easy to operate.

Japanese Patent Laying-Open No. 61-243581 discloses a handwritten character input apparatus which allows change of the size of the character writing frames.

Japanese Utility Model Laying Open-No. 5-66765 discloses an on-line character recognizing apparatus in which number or size of the character writing frames can be changed. These apparatuses are configured such that the number or size itself of the character writing frame can be directly changed by the user.

SUMMARY OF THE INVENTION

An object of the present invention is to provide a handwritten character input system which can be more easily operated by the user.

Another object of the present invention is to provide a handwritten character input system to which handwritten characters can be more easily input by the user.

A still further object of the present invention is to provide a handwritten character input system in which recognized and displayed characters can be more easily confirmed by the user.

A still further object of the present invention is to provide a handwritten character input system in which size of the character writing frame can be more easily changed by the user.

A still further object of the present invention is to provide a hand written character input system in which the number of character writing frames can be more easily changed by the user.

A still further object of the present invention is to provide a handwritten character input system in which recognized character is displayed in the most suitable form on the character writing frame.

The handwritten character input system in accordance with the present invention includes an input unit, a display unit, a first changing unit and a second changing unit. The input unit is for inputting one or more handwritten characters. The display unit displays, in the input unit, one or more character writing frames and a data input frame. The first changing unit changes the size of the data input frame. The second changing unit changes the size of the character writing frame in response to the size of the data input frame changed by the first changing unit.

Therefore, one advantage of the present invention is that operation by the user is easier, since the size of the character writing frame is changed in response to the size of the data input frame when the user changes the size of the data input frame.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 18A to 18C are illustrations of an operation for changing display font as shown in FIGS. 15 and 16.

DESCRIPTION OF THE PREFERRED EMBODIMENTS

Embodiments of the present invention will be described in detail with reference to the figures.

EMBODIMENT 1

Figure 1:
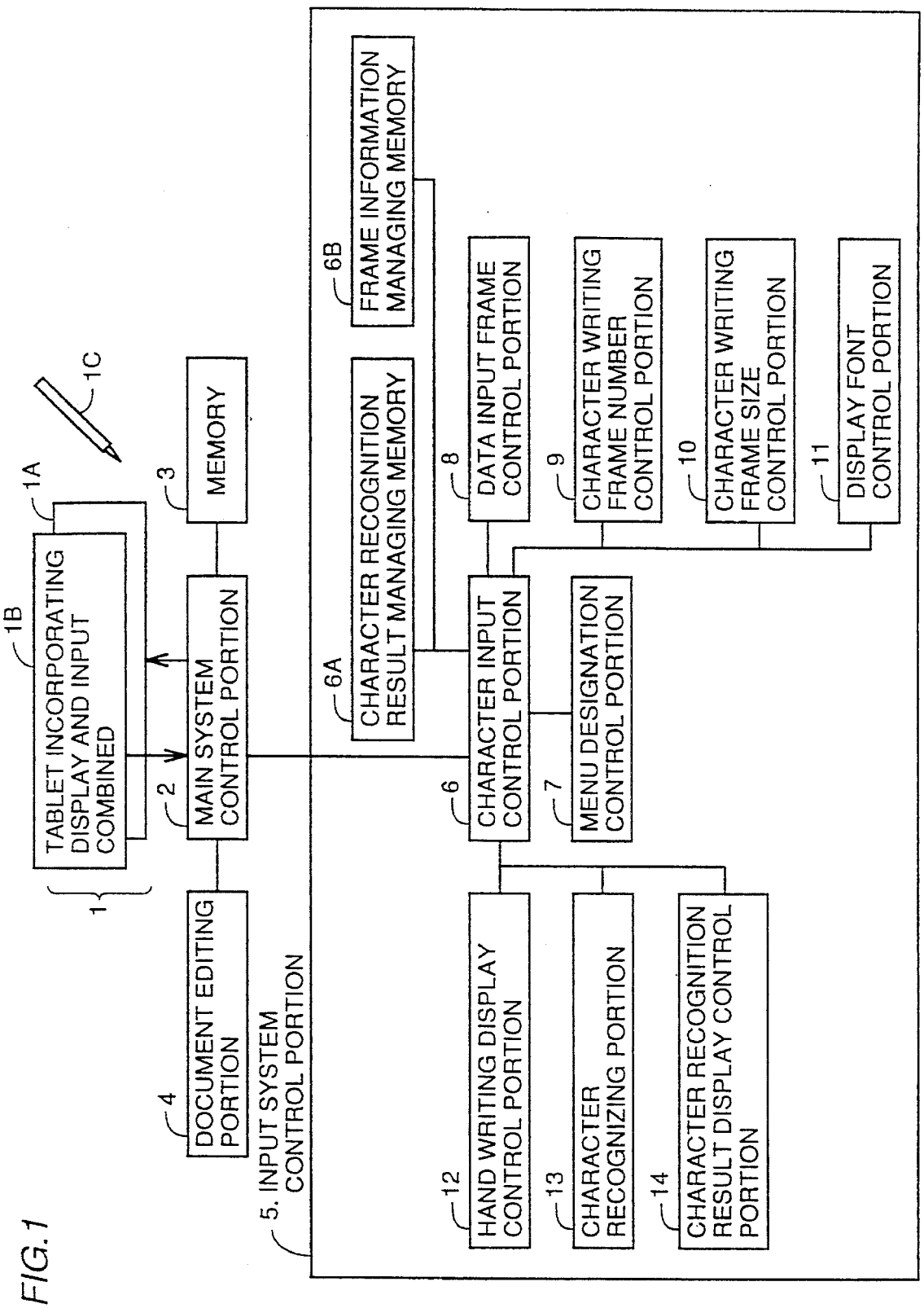
FIG. 1 is a block diagram showing a whole structure of a handwritten character input system in accordance with a first embodiment of the present invention.

FIG. 1 is a block diagram showing the whole structure of a handwritten character input system in accordance with a first embodiment of the present invention.

Referring to FIG. 1, the handwritten character input system includes an input portion 1, a main system control portion 2, a memory 3, a document editing portion 4 and an input system control portion 5.

Input portion 1 is constituted by tablet 1A and 1B incorporating display and input combined (hereinafter referred to as a tablet), and a pen 1C. The table is formed by integrating a liquid crystal display panel 1A and a coordinate input panel 1B for detecting a coordinate of a position pointed by pen 1C. The coordinate on coordinate input panel 1B is in one to one correspondence with the coordinate on liquid crystal display panel 1A.

Figure 19:
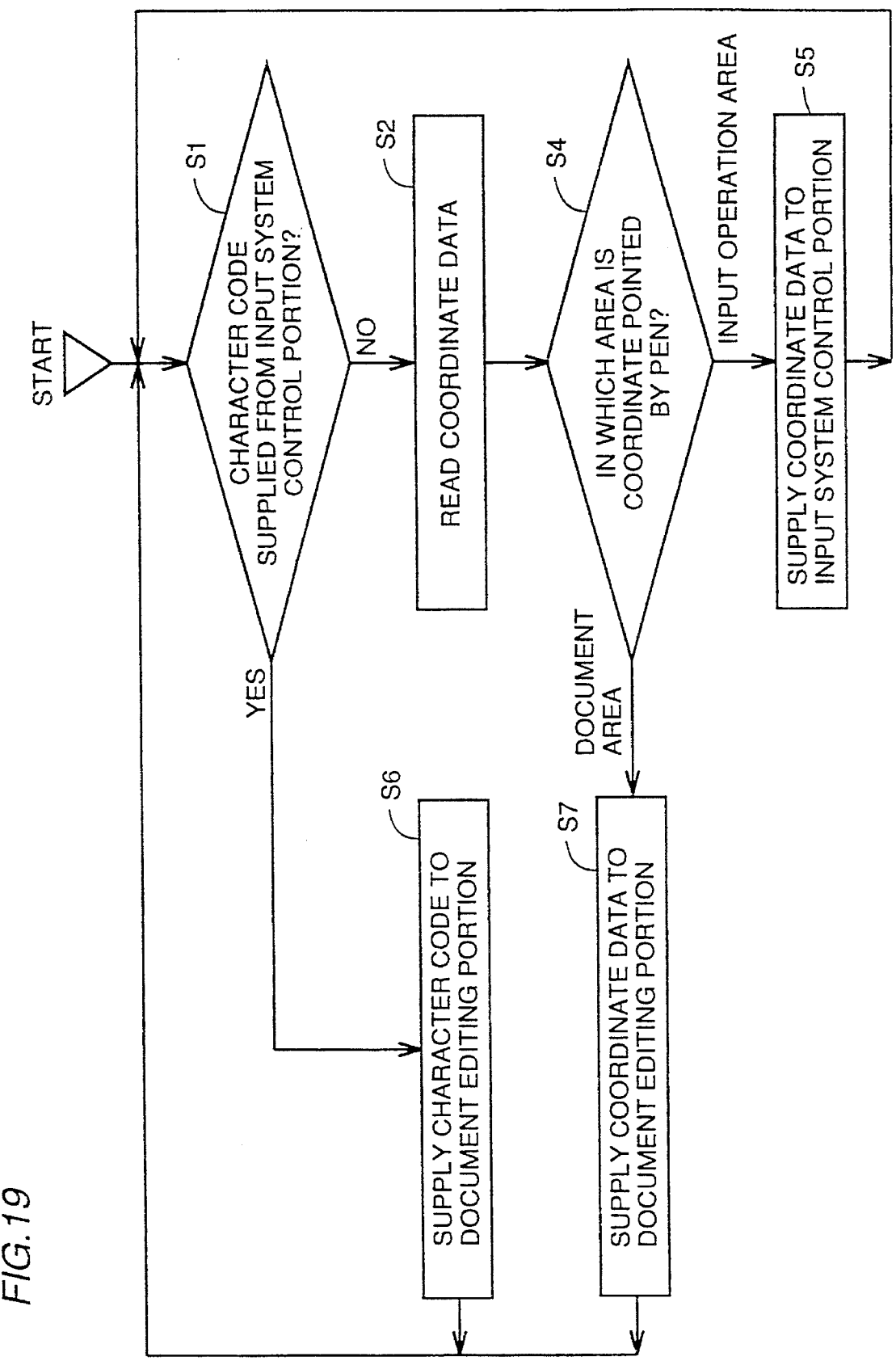
FIG. 19 is a flow chart showing the operation of the main system control portion in the handwritten character input system shown in FIG. 1.

Main system control portion 2 controls the overall handwritten character input system. The main system control portion 2 mainly receives coordinate data from coordinate input panel 1B and supplies the data to input system control portion 5. System control portion 2 also controls liquid crystal display panel 1A. The operation of system control portion 2 is shown in FIG. 19, which will be described in detail later.

Document editing portion receives a character code from main system control portion 2 and supplies the code to an associated document memory (not shown). The character code stored in the document memory of document editing portion 4 is displayed on liquid crystal display panel 1A through main system control portion 2. Input system control portion 5 receives coordinate data of a handwritten character from coordinate input panel 1B through main system control portion 2. Input system control portion 5 also supplies the coordinate data to liquid crystal display panel 1A through main system control portion 2. Liquid crystal display panel 1A displays a handwritten character corresponding to the coordinate data.

Input system control portion 5 carries out character recognition based on the coordinate data, and supplies the resulting data to liquid crystal display panel 1A through main system control portion 2.

Liquid crystal display panel 1A displays the recognized character in print, in response to the resulting data of character recognition.

Input system control portion 5 supplies the resulting data of character recognition to document editing portion 4 through main system control portion 2. Document editing portion 4 stores the resulting data as a character code.

Input system control portion 5 also carries out a process for changing size or number of the character writing frames, and also effects a process for changing a character font to be displayed, in response to the data of the result of character recognition.

Figure 20:
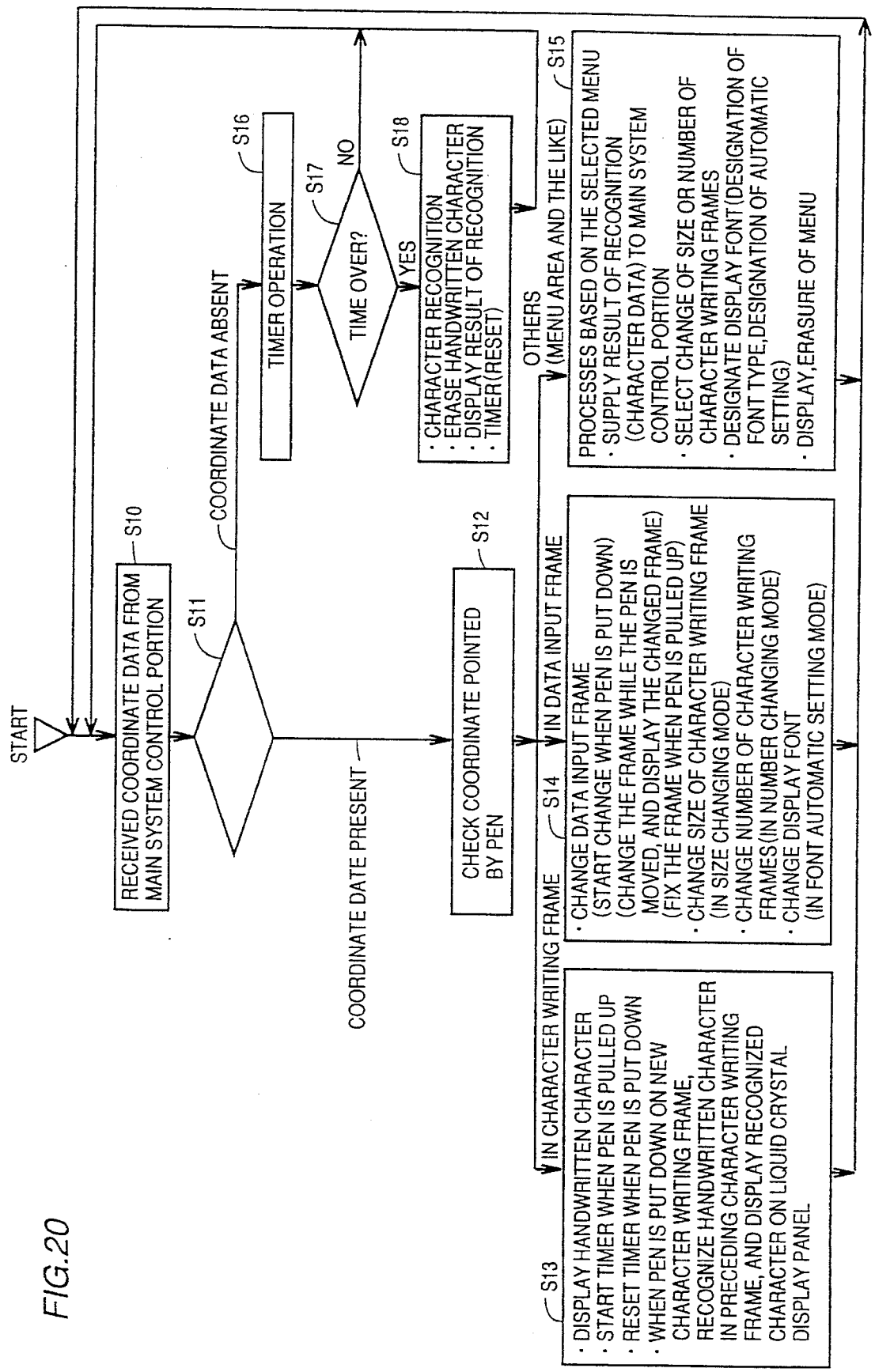
FIG. 20 is a flow chart showing the operation of the input system control portion in the handwritten character input system shown in FIG. 1.

Input system control portion 5 is a characterizing portion of the present invention. The operation of input system control portion 5 is shown in FIG. 20, which will be described in detail later.

Input system control portion 5 is constituted by a software, which includes a character input control portion 6, a character recognition data managing memory 6A, a frame information managing memory 6B, a menu designation control portion 7, a data input frame control portion 8, a character writing frame number control portion 9, a character writing frame size control portion 10 and a display font control portion 11.

Character input control portion 6 controls the overall input system control portion as a whole. Frame information managing memory 6B stores information as to whether the number or size of the character writing frames is to be changed, when a data input frame (which will be described later) is changed. Frame information managing memory 6B also stores information related to the character writing frames, such as the number and size of the character writing frames and the type of the display font.

Data input frame control portion 8 is one of the main features of the present invention, which controls the size of the data input frame. Such technique is widely known as a method of changing a window area in a multiwindow system.

Character writing frame number control portion 9 is also one of the main features of the present invention, which controls the number of the character writing frames. Character writing frame size control portion 10 is also one feature, which controls the size of the character writing frames. Display font control portion 11 is also a feature of the present invention, which controls the font of the recognized character to be displayed on the character writing frame.

Input system control portion 5 further includes a handwriting display control portion 12, a character recognizing portion 13 and a character recognition result display control portion 14.

Handwriting display control portion 12 receives coordinate data of a handwriting from coordinate input panel 1B through main system control portion 2 and character input control portion 6. Handwriting display control portion 12 supplies the coordinate data to liquid crystal display panel 1A through character input control portion 6 and main system control portion 2. Liquid crystal display panel 1A displays a handwriting corresponding to the coordinate data. Handwriting display control portion 12 erases, after the handwritten character is recognized, the handwritten character.

Character recognizing portion 13 recognizes a character consisting of coordinate data. More specifically, character recognizing portion 13 calculates the feature of the coordinate data as a character, collates the feature with the feature of a character stored in advance in accordance with the types of characters in an associated dictionary for character recognition (not shown), and provides a character which has the closest feature as the result of recognition. Character recognition result display control portion 14 supplies the result of recognition from character recognizing portion 13 to liquid crystal display panel 1A through character input control portion 6 and main system control portion 2. Liquid crystal display panel 1A displays a print corresponding to the result of recognition.

Basic operation of the handwritten character input system will be described with reference to FIGS. 2 to 5. FIGS. 2 to 5 show transition of contents displayed on tablet 1A and 1B, when a handwritten character is input.

Figure 2:
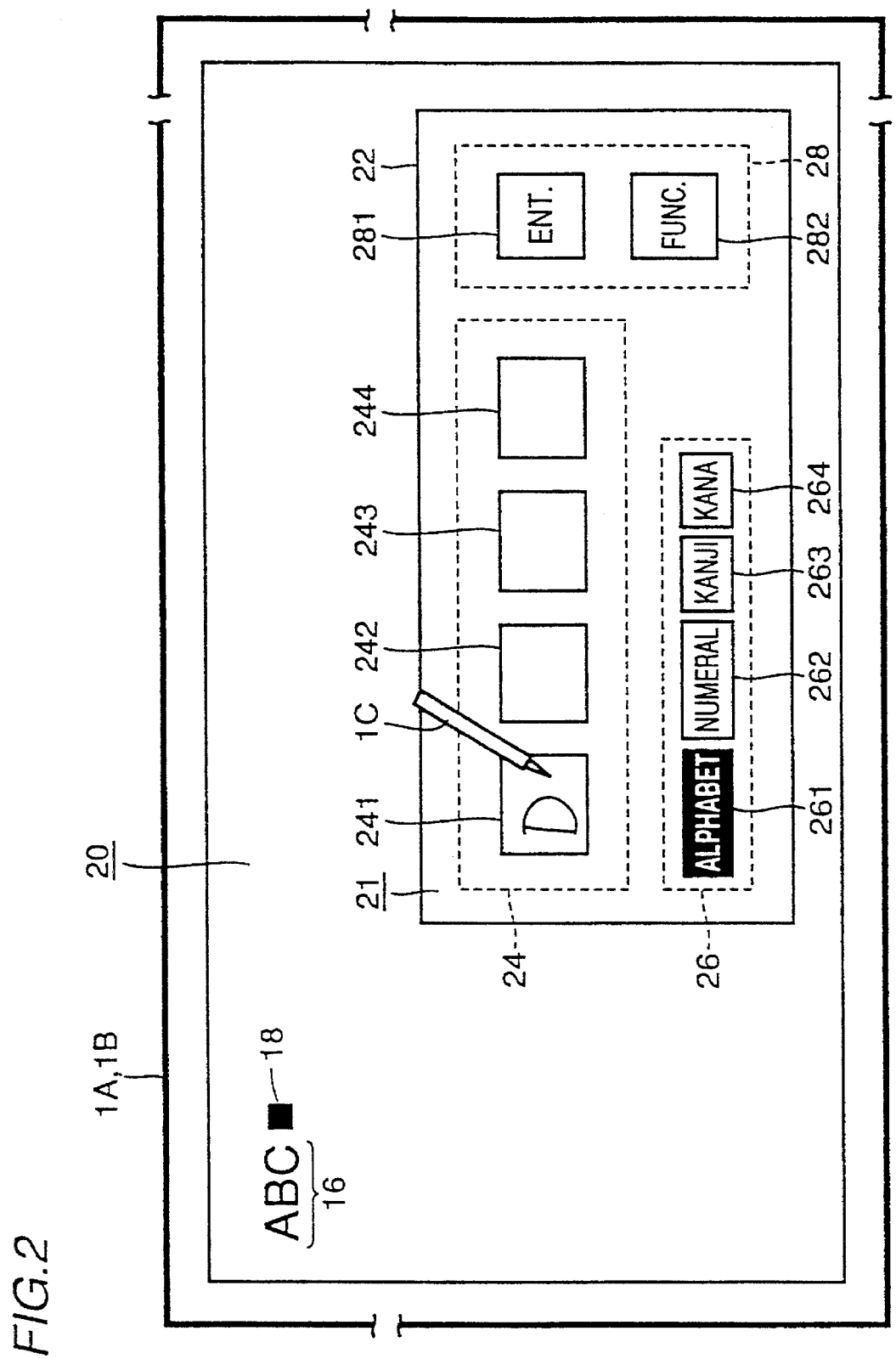
FIG. 2 shows a tablet including display and input unit combined, on which one image plane is displayed, for facilitating understanding of the input operation of handwritten characters.

Referring to FIG. 2, the tablet includes a document area 20 on which a document from a document editing portion 4 is displayed, and an input operation area 21.

On document area 20, a character train 16 including "A", "B" and "C" which are already stored in document editing portion 4 are displayed. On the right side of the character train 16, there is displayed a cursor 18. On the border between document area 16 and input operation area 21, there is displayed a data input frame 22. Data input frame 22 defines the input operation area 21.

Input operation area 21 in data input frame 22 includes a character writing area 24, a character type selecting area 26, and a menu area 28. In character writing area 24, there are four character writing frames 241 to 244 displayed, in each of which one character is to be handwritten. On character type selecting area 26, a selection key 261 is displayed, which is for selecting in which type of character should the characters written in character writing frames 241 to 244 are to be recognized. In FIG. 2, the selection key 261 of "ALPHABET" is highlighted. Therefore, the characters written in character writing frames 241 to 244 are recognized as alphabets.

On menu area 28, displayed are an entry key 281 for designating transfer of the characters which have been written in character writing frames 241 to 244 and recognized, to document area 20, and a function key 282 for reading various function menus.

First, when a letter "D" is handwritten by means of pen 1C in character writing frame 24a, the letter of the handwriting is displayed on character writing frame 241.

Figure 3:
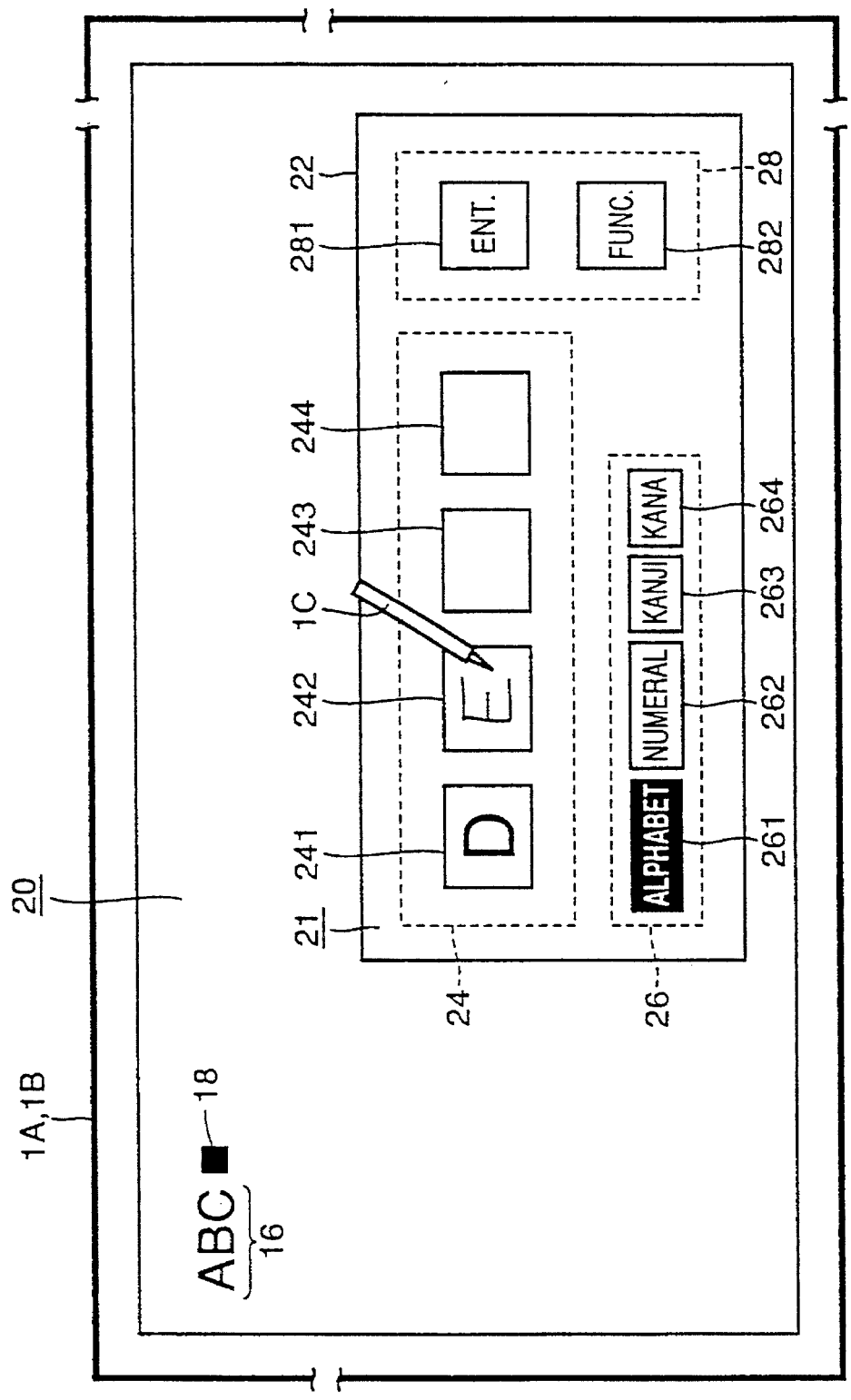
FIG. 3 shows the tablet on which an image plane following that of FIG. 2 is displayed.

When handwriting of another character in another character writing frame 242 starts as shown in FIG. 3, the handwritten character in character writing frame 241 is recognized, and in place of the handwriting, the letter "D" in print is displayed on character writing frame 241. When a letter is handwritten in the character writing frame 241 and other operation is not carried out for a prescribed time period thereafter, the letter in print is displayed in place of the handwritten character in the character writing frame 241, in the similar manner as described above.

Figure 4:
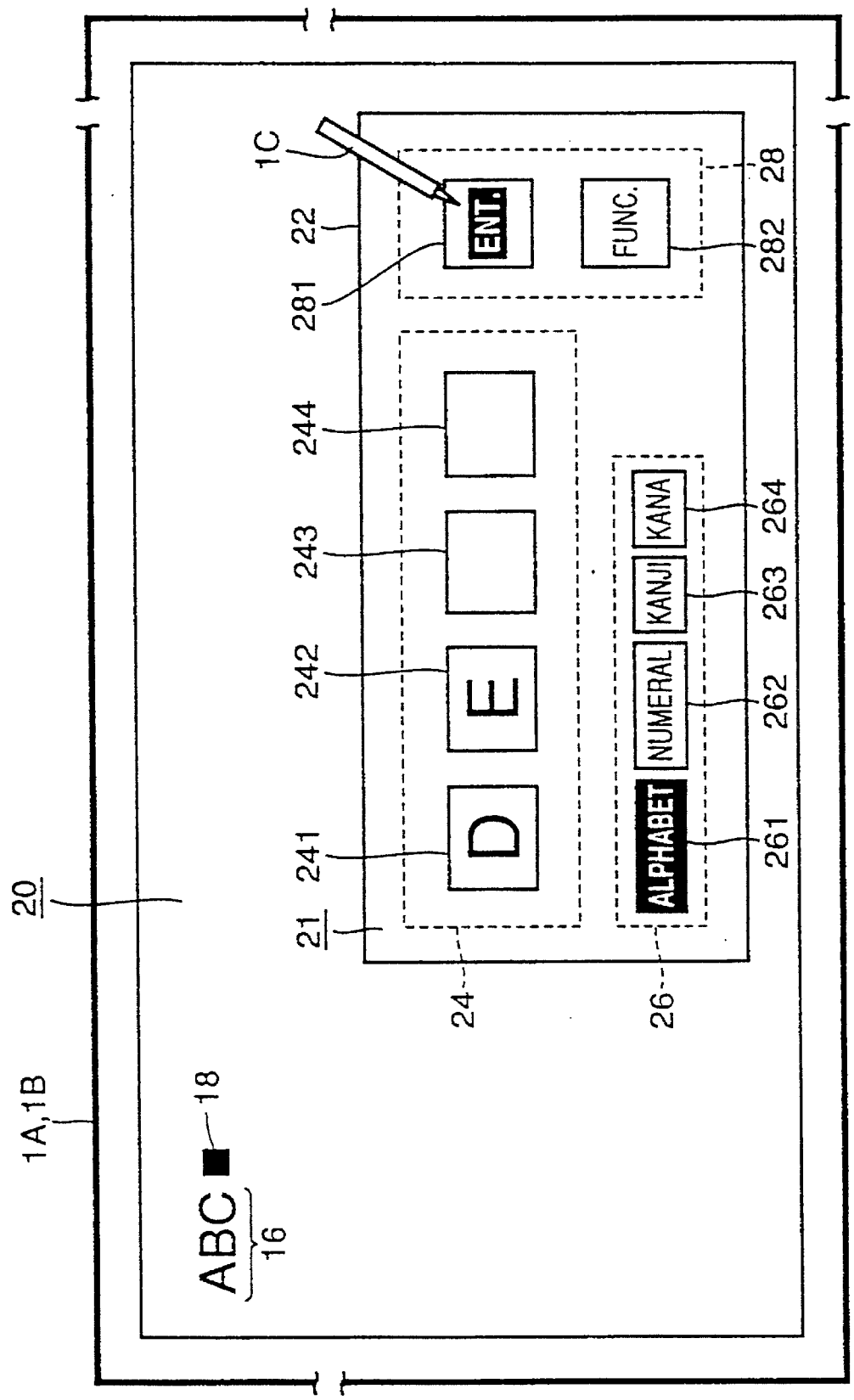
FIG. 4 shows the tablet on which the image plane following that of FIG. 3 is displayed.

In character writing frame 242, the letter "E" is handwritten by means of pen 1C, and the handwriting of that letter is displayed on the character writing frame 242. When no other operation is carried out for a prescribed time period thereafter, the letter "E" in print is displayed in place of the handwriting, in the character writing frame 242, as shown in FIG. 4.

Figure 5:
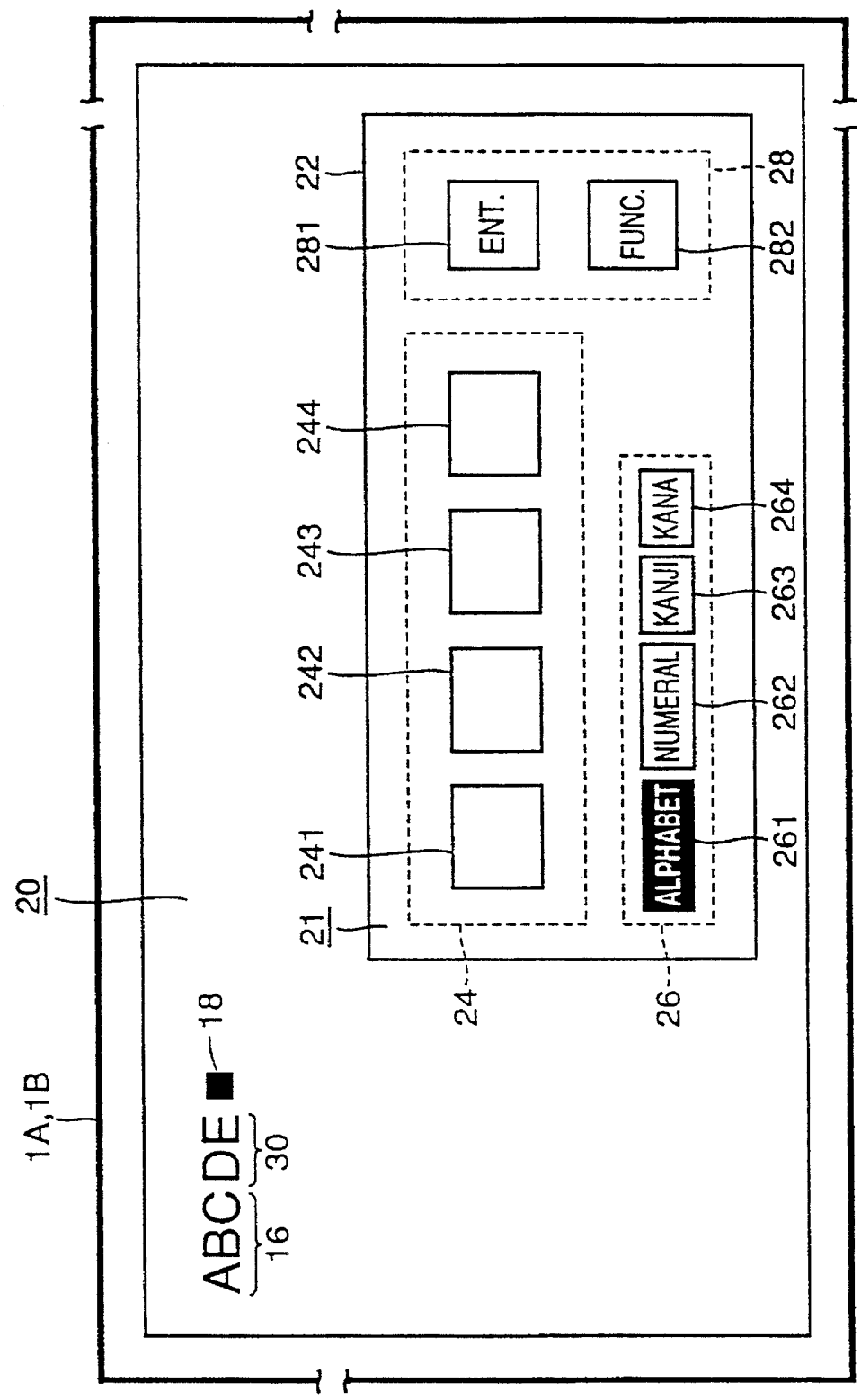
FIG. 5 shows the tablet on which the image plane following that of FIG. 4 is displayed.

Thereafter, when entry key 281 is pointed by pen 1C, the character train including "D" and "E" in the character writing area are transferred to the position corresponding to the cursor of the document area 20. As a result, the character train 30 including "D" and "E" is displayed on the document area 20 as shown in FIG. 5.

The above operation will be described together with the structure of the handwritten character input apparatus shown in FIG. 1.

When a character is handwritten by pen 1C in data input frame 22 on tablets 1A, 1B or when any of keys 261 to 264, 281 and 282 is pointed, a coordinate data corresponding thereto is supplied to input system control portion 5 through main system control portion 2. If the coordinate data is in the character writing frames 241 to 244, character input control portion 6 supplies the coordinate data to handwriting display control portion 12 handwriting display control portion 12 supplies the coordinate data to liquid crystal display panel 1A through character input control portion 6 and main system control portion 2. Liquid crystal display panel 1A displays handwritten characters corresponding to the coordinate data in character writing frames 241 to 244. If the coordinate data is in the character type selecting area 26, the character input control portion 6 informs the character recognizing portion 16 about the type of character by which the hand written characters of given coordinate data are recognized.

Character input control portion 6 stores coordinate data of the handwritten characters written in character writing frames 241 to 244 for each of the frames 241 to 244, and if the coordinate data given corresponds to a character writing frame other than that character writing frame to which a character has been written, then the control portion applies the coordinate data of that character writing frame to which the character has been written, to the character recognizing portion 13. Character recognizing portion 13 recognizes the character based on the coordinate data.

Character input control portion 6 also supplies the coordinate data of the character writing frame to which the character has been written to character recognizing portion 13, if coordinate data is not supplied for a prescribed time period from main system control portion. Character recognizing portion 13 recognizes the character based on the coordinate data.

The data of the result of character recognition is stored in character recognition result managing memory 6A. Character input control portion 6 instructs, when it receives the data of the result from character recognizing portion 13 as a character code, to erase the handwritten character which has been written, to handwriting display control portion 12. Handwriting display control portion 12 erases the handwritten character in the character writing frame which corresponds to the recognized character code.

Character input control portion 6 supplies data for specifying the character writing frame, and the character code to character recognition result display control portion 14. Character recognition result display control portion 14 controls liquid crystal display panel 1A such that it displays a print based on the character code, in a specified character writing frame. This print is specified by display font control portion 11, the details of which will be described later.

If the coordinate data from main system control portion 2 is in the menu area 18, character input control portion 6 supplies data indicating whether the data is of the entry key 288 or the function key 282 to menu designation control portion 7. Menu designation control portion 7 carries out a function corresponding to the designated data.

If entry key 288 is pointed, menu designation control portion 7 requests character input control portion 6 to transfer the recognized character to the document area 20. Character input control portion 6 supplies the character code stored in character recognition result managing memory 6A to main system control portion 2, and request character recognition result display portion 14 to erase the recognized character. Character recognition result display control portion 14 erases the recognized character which has been displayed on liquid crystal display panel 1A.

As described above, in the handwritten character input system, the character can be input by handwriting and therefore characters can be input easily even if the user is unable to operate keyboards and the like.

Figure 6:
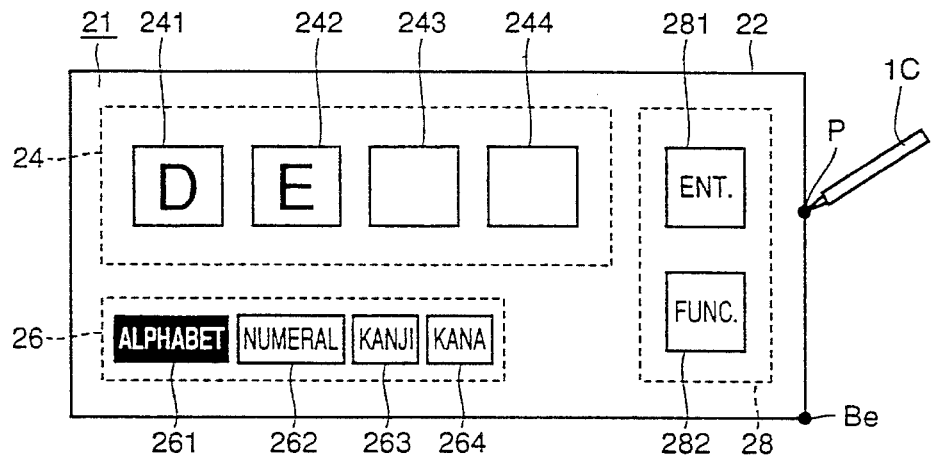
FIG. 6 shown an image plane displayed on the tablet, for easier understanding of the operation for changing the number of character writing frames in the handwritten character input system shown in FIG. 1.
Figure 7:
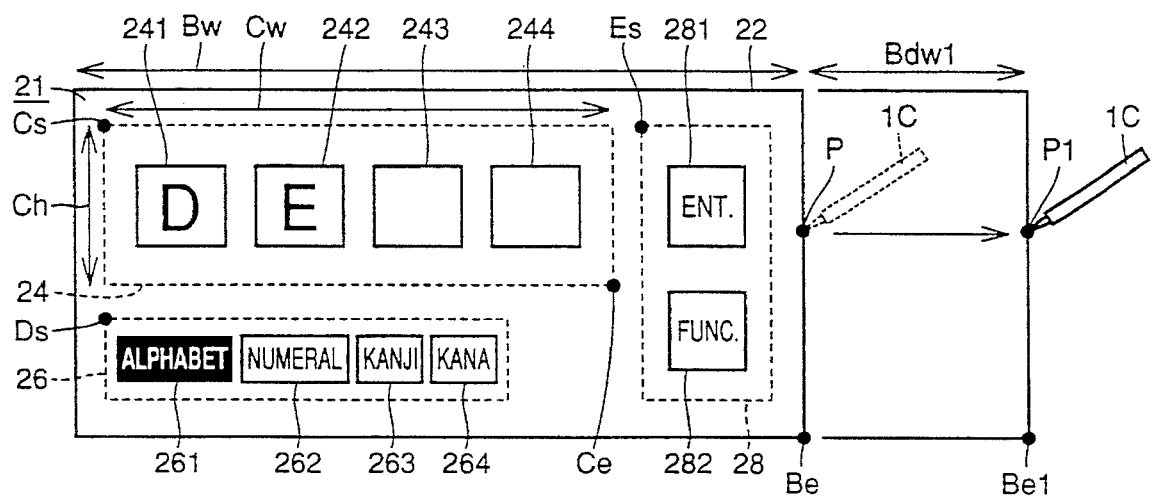
FIG. 7 shows the displayed image following that of FIG. 6.
Figure 8:
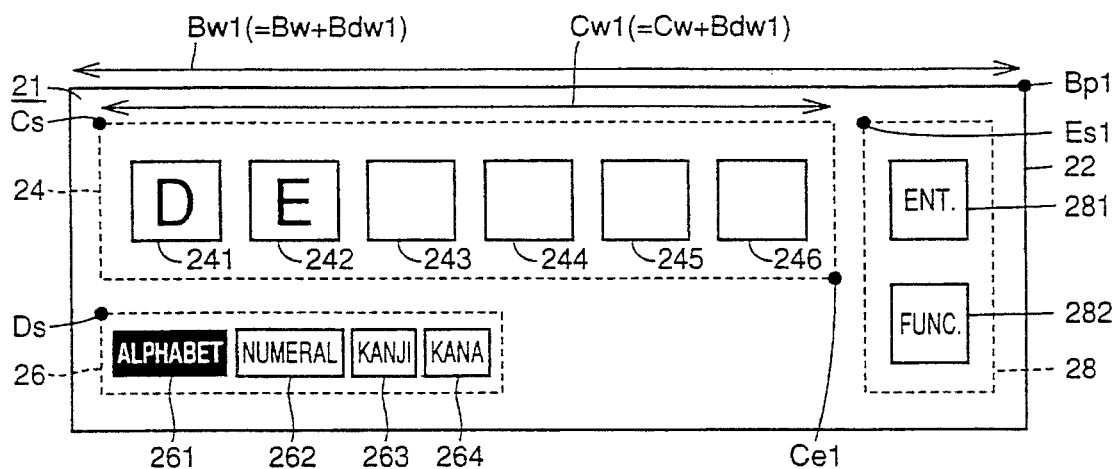
FIG. 8 shows the displayed image following that of FIG. 7.

The operation for changing the number of character writing frames will be described with reference to FIGS. 6 to 8. The operation for changing the number of character input frames is one of the features of the present invention. FIGS. 6 to 8 show transition on the display screen when the number of character writing frames is changed.

Referring to FIG. 6, pen 1C is put down at point P on data input frame. Referring to FIG. 7, when pen 1C is moved widthwise from point P1 to point P1, the size of data input frame 22 is enlarged. At this time, pen 1C is moved while it is kept in contact with coordinate input panel 1B. Therefore, as the pen 1C moves laterally from point P, the lateral width of data input frame 22 gradually becomes longer.

Referring to FIG. 8, when pen 1C is pulled up at point P1, the size of character writing area 24 is enlarged in accordance with the size of the enlarged new data input frame 22, and the position of menu area 28 is changed. The position of character type selecting area 26 is not changed.

Assume that the width Bw of data input frame 22 is made wider by Bdw1, the width of Cw of the character writing area 24 is also enlarged by Bdw1, and the position of menu area 28 moves to the right by Bdw. Therefore, the diagonal coordinates of character writing area 24 change from Cs-Ce to Cs-Ce1. The reference coordinate of the menu area 28 moves from Bs to Bs1.

In accordance with the size of the enlarged new character writing area 24, the number of character writing frames is increased. More specifically, referring to FIGS. 6 and 7, four character writing frames 241 to 244 are increased by two, to six character writing frames 241 to 246, as shown in FIG. 8.

The operation for changing the number of character writing frames will be described together with the structure shown in FIG. 1.

At first, in frame information managing memory 6B, a frame number changing mode is set. The coordinate data from coordinate input panel 1B is applied to character input control portion 6 through main system control portion 2. If the coordinate data is of the data input frame 22, character input control portion 6 supplies the coordinate data of from the point on which the pen 1C is put down to the position at which the pen is pulled up, to data input frame control portion 8. Data input frame control portion 8 changes the size of the data input frame 22 gradually. More specifically, referring to FIG. 7, when pen 1C is put down on point P, moved laterally from point P to point P1 and pulled up at point P1, data input frame control portion 8 changes the size of data input frame 22 in accordance with the coordinate data from point P to point P1. At this time, in accordance with the new size of data input frame 22, the size of character writing area 24 is changed, and the menu area 28 is rearranged.

When coordinates Cs-Ce1 for specifying the character writing area 24 is determined, data input frame 8 supplies the coordinates to character input control portion 6. Character input control portion 6 supplies the coordinate Cs-Ce1 to character writing frame number control portion 9. Character writing frame number control portion 9 resets the number of character writing frames 241 to 246 in accordance with the coordinates. More specifically, character writing frame number control portion 9 fixes the size of the character writing frames 241 to 246 and calculates the number of character writing frames 241 to 246 which can be accommodated in the character writing area 24.

Figure 9:
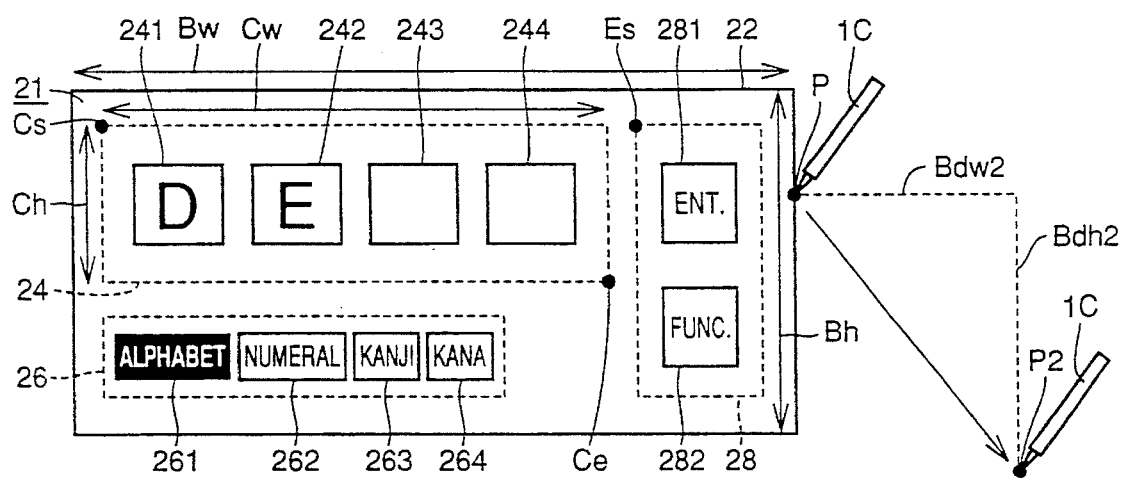
FIG. 9 shows an image plane displayed on the tablet, for easier understanding of another operation of changing the number of character writing frame.
Figure 10:
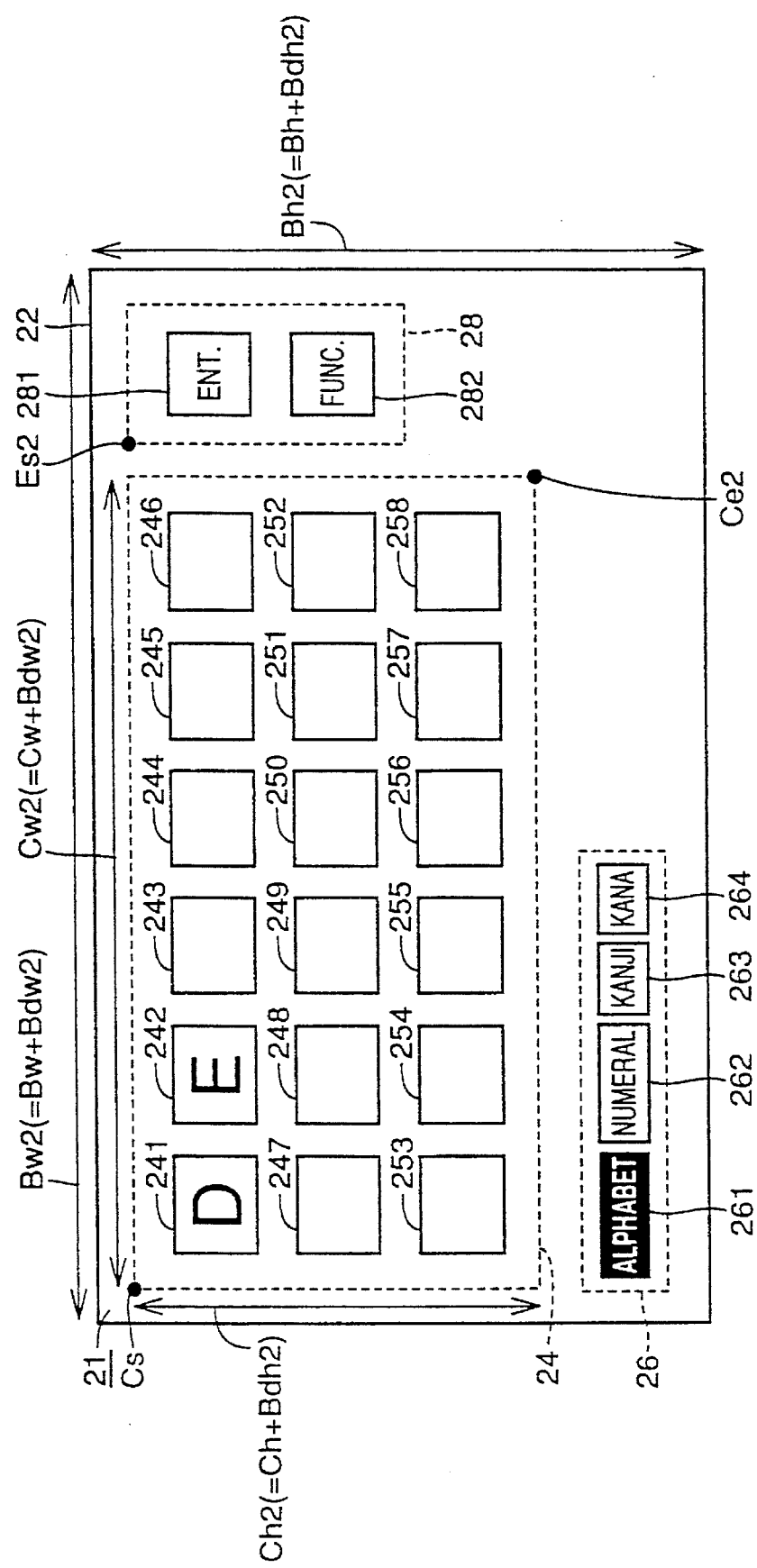
FIG. 10 shows a displayed image following that of FIG. 9.

FIGS. 9 and 10 show transition on the display screen on the liquid crystal display panel 1A in another example of changing the number of character writing frames.

Referring to FIGS. 9, when pen 1C is put down on point P in data input frame 22, moved diagonally downward to the right from point P to P2 and pulled up at point P2, the size of data input frame 22 is enlarged as shown in FIG. 10, menu area 28 is rearranged and the size of the character writing area 24 is enlarged. In accordance with the size of the enlarged character writing area 24, the number of character writing frames 241 to 258 is increased.

In FIG. 9, pen 1C is moved by Bdw2 in the lateral direction, while it is moved by Bdh in the lengthwise direction. Therefore, as shown in FIG. 10, the width Bw of data input frame 22 is enlarged by Bdw2, while the length Bh of data input frame 22 is enlarged by Bdh2. The reference coordinate Es of the menu area moves in the lateral direction by Bdw2. The width Cw of character writing area 24 is enlarged by Bdw2, while the length Ch of character writing area 24 is enlarged by Bdw2.

The number of character writing frames is increased from 4 to 18. The position of character type selecting area 26 is not changed.

As described above, when pen 1C is moved diagonally, the length and width of data input frame 22 are changed simultaneously.

Figure 11:
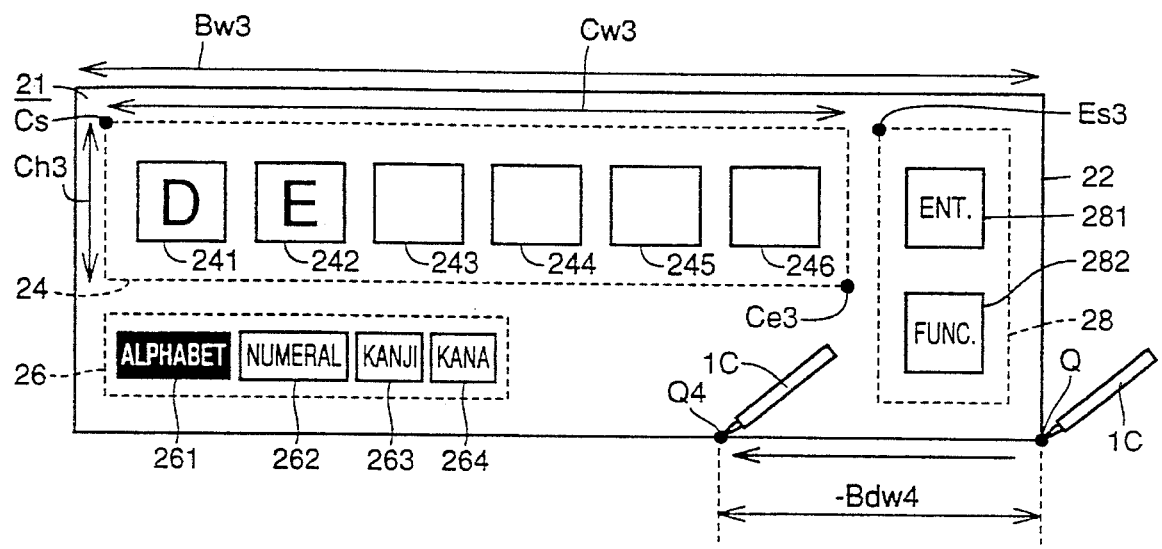
FIG. 11 shows an image displayed on the tablet for easier understanding of a still further operation for changing the number of character writing frames.
Figure 12:
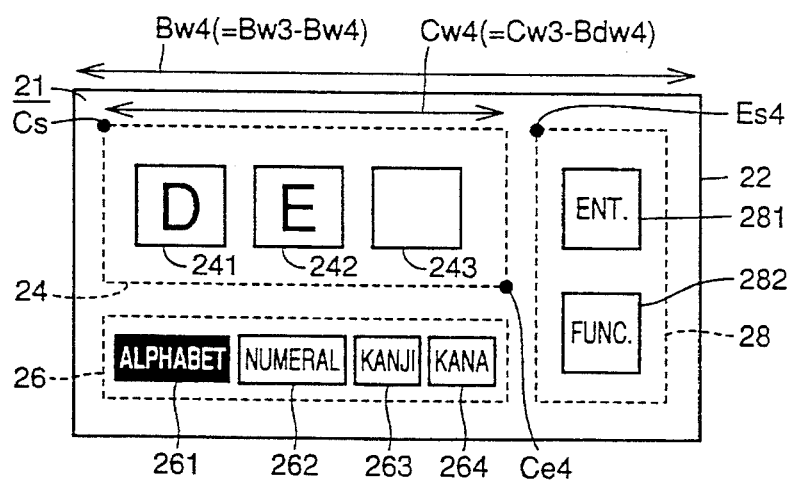
FIG. 12 shows a displayed image following that of FIG. 11.

FIGS. 11 and 12 show transition on the display screen of liquid crystal display panel 1A in a still another example of changing the number of character input frames.

Referring to FIG. 11, when pen 1C is put down on point Q in data input frame 22, moved from point Q to point Q4 and pulled up at point Q4, the size of data input frame 22 is reduced and menu area 28 is rearranged as shown in FIG. 12. In accordance with the size of the reduced data input frame 22, the size of the character writing area 24 is reduced, and the number of character writing frames 241 to 243 is reduced in accordance with the size of the reduced character writing area 24.

More specifically, as shown in FIG. 11, when pen 1C is moved in the left by Bdw4, the reference coordinate Es4 of the new menu area 28 moves in the left direction by Bdw4 from the previous reference position Es3. The width Bw4 of the new character writing area 24 is made shorter by Bdw4 than the previous width Bw3. The length of Ch3 of character writing area 24 is not changed. The position of character type selecting area 26 is not changed, either.

As described above, in the handwritten character input system, the number of character writing frames is changed in accordance with the size of the data input frame 22, and therefore the user can easily change the number of character writing frames.

The method of calculating the number of character writing frames in character writing frame number control portion 9 will be described.

Figure 13A:
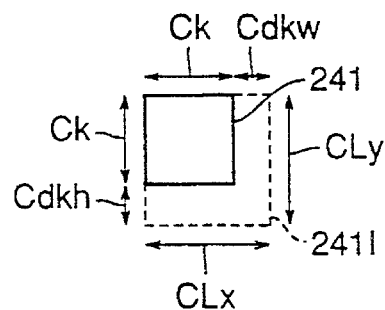
FIGS. 13A to 13C show a method of calculating the number of character writing frames, when the number is to be changed as shown in FIGS. 6 to 12.

FIG. 13A shows a character writing frame and an imaginary frame. Referring to FIG. 13A, the reference character Ck represents the length of one side of the character input frame. The reference character Cdkw represents a distance to a laterally adjacent character writing frame. The reference character Cdkh represents a distance to a longitudinally adjacent character writing frame. CLx (=Ck+Cdkw) represents the width of the imaginary frame 241I. CLy (=Ck+Cdkh) represents the length of the imaginary frame 241I. The imaginary frame 241I is used for calculating the number of character writing frames.

Figure 13B:
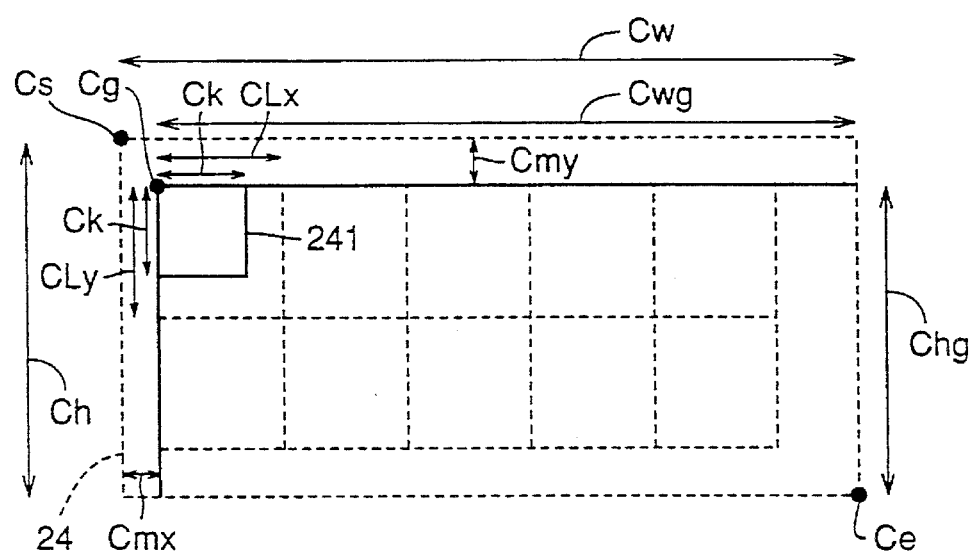

Referring to FIG. 13B, reference characters Cs and Ce represent diagonal coordinates of character writing area 24. Cg represents the reference coordinate of the character writing frame 241 positioned at the upper left corner. Cw represents the width of character writing area 24. Ch represents the length of character writing area 24. Cwg represents the distance from the reference coordinate Cg of character writing frame 241 to the right end of character writing area 24. Chg represents the distance from the reference coordinate Cg of character writing frame 241 to the lower end of character writing area 24.

Figure 13C:
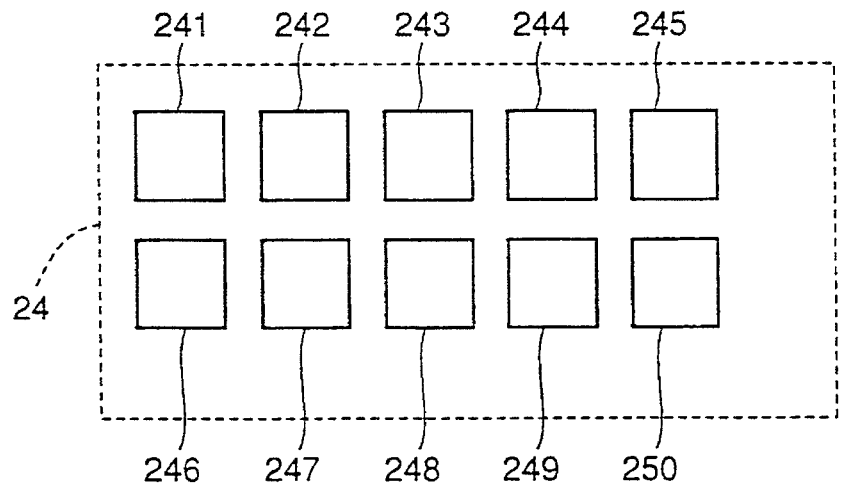

The number of the character writing frames in the lateral direction is determined by an integer part of a quotient calculated in accordance with (Cwg÷CLx). The number in the lengthwise direction of the character writing frame is determined by the integer part of a quotient calculated in accordance with (Chg÷CLy). For example, if the number in the lateral direction of the character writing frames is 5 and the number in the lengthwise direction is 2, 10 character writing frames 241 to 250 are arranged at prescribed positions as shown in FIG. 13C.

The operation for changing the size of the character writing frame will be described with reference to FIGS. 14 to 16.

FIGS. 14B to 16 show transition on the display screen of the liquid crystal display panel in this operation.

Figure 14A:
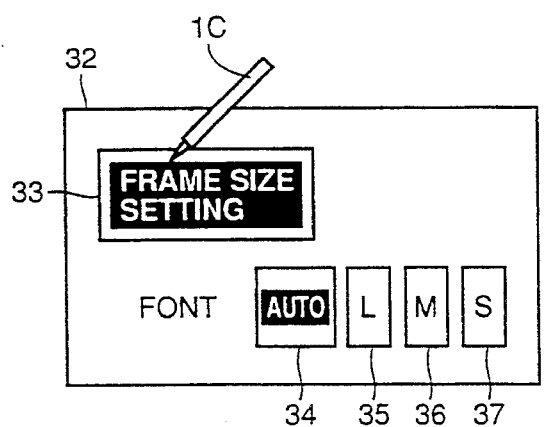
FIG. 14A shows an image displayed on the tablet, for easier understanding of the size of the character writing frame and display font on the handwritten character input system shown in FIG. 1.

First, in an operation mode for changing the number of character writing frames, when the function key 282 in menu area 28 shown in FIGS. 2 to 12 is pointed by pen 1C, a menu 32 is displayed on the liquid crystal display panel 1A as shown in FIG. 14A. Menu 32 includes a frame size setting key 33 for designating change of the number of character writing frames or change of the size of the character writing frame, an automatic font selecting key 34 for designating automatic selection of an optimal font to be displayed in accordance with the size of the character writing frame, and specific font setting keys 35 to 37 for designating selection of a desired font regardless of the size of the character writing frame. In FIG. 14A, automatic font selecting key 34 is pointed and highlighted.

When frame size setting key 33 is pointed by pen 1C, the frame size setting key 33 is highlighted, and the operation mode is changed to the mode for changing the size of the character writing frame.

Figure 15:
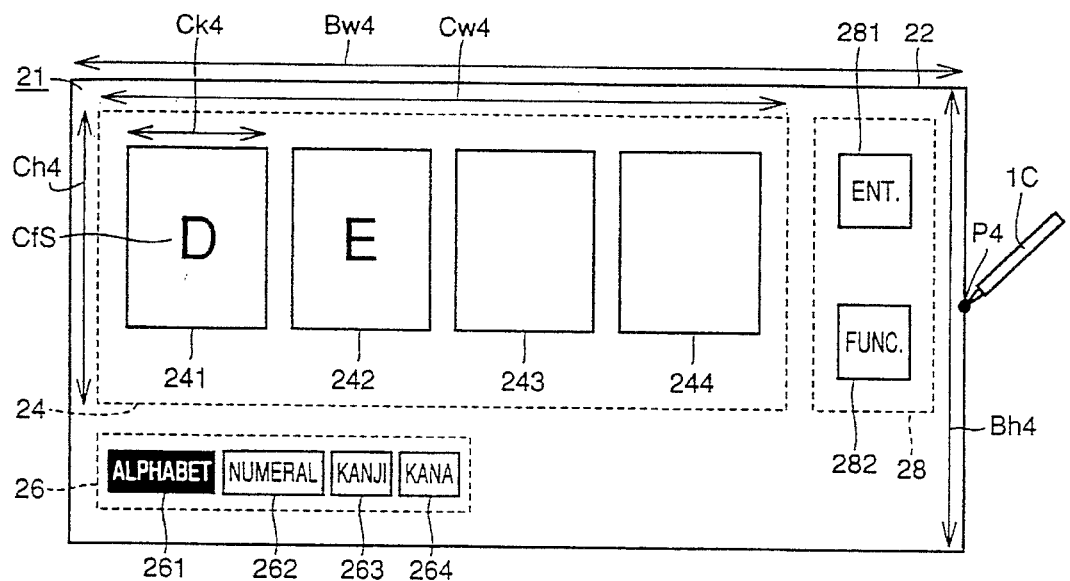
FIG. 15 shows a displayed image following that of FIG. 14B.
Figure 16:
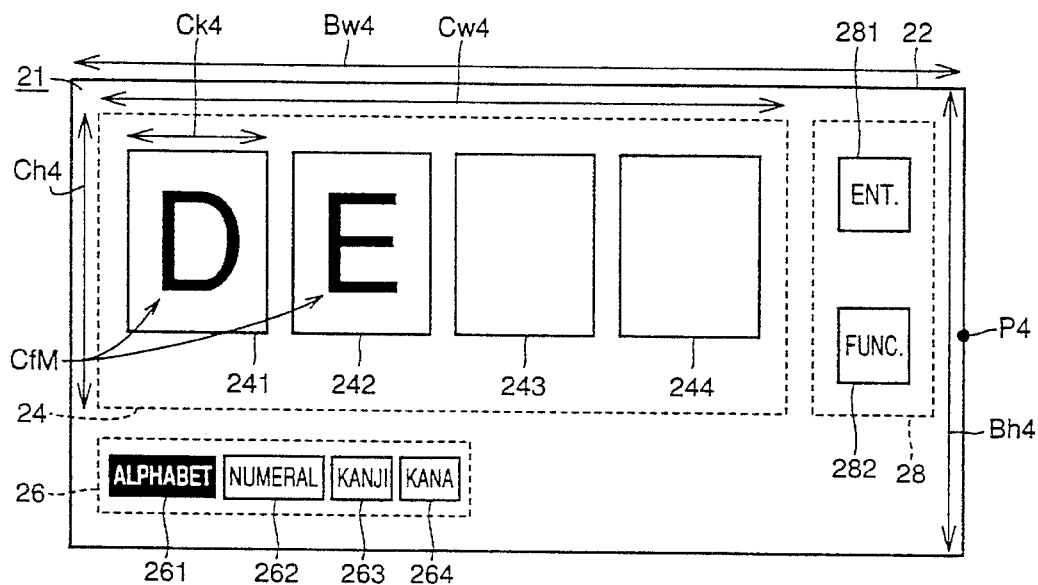
FIG. 16 shows a displayed image following that of FIG. 15.

In this frame size changing mode, when pen 1C is put down on point P in data input frame 22 and moved to point P4, the size of data input frame 22 is enlarged as shown in FIG. 15. When the size of data writing frame 22 is enlarged, the size of the character writing frame 24 is enlarged in accordance with the enlarged size of the frame 22, and the menu area 28 is rearranged. In accordance with the size of the enlarged character writing area 24, the size of character writing frames 241 to 244 is enlarged.

The operation for changing the size of the character writing frame together with the structure shown in FIG. 1 will be described.

In a mode for changing the size of the character writing frame, when data input frame control portion 8 enlarges the size of data input frame 22 and character writing area 24 is enlarged, character input control portion 6 supplies the coordinates of the enlarged character writing area 24 to character writing frame size control portion 10. Character writing frame size control portion 10 enlarges the size of the character writing frames 241 to 244 in accordance with the given coordinates. In the first embodiment, the number of character writing frames 241 to 244 in the lateral direction is fixed, and the size of character writing frames 241 to 244 which can be accommodated in the enlarged character writing area 24 is calculated. The width of each of character writing frames 241 to 244 is equal to the length.

When the size (width and length) of character writing frames 241 to 244 is determined, character input control portion 6 supplies the length of character writing frames 241 to 244 to character writing frame number control portion 9. Character writing frame number control portion 9 resets the number in the longitudinal directions of the character writing frame. When the size and the number in the longitudinal direction of character writing frames 241 to 244 are determined, the character writing frames 241 to 244 are enlarged as shown in FIG. 15.

A method of calculating the size of the character writing frame when the size of data input frame 22 is changed will be described.

Figure 17A:
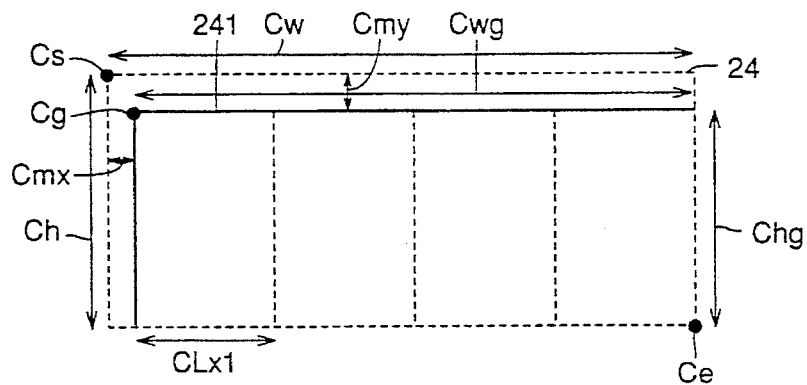
FIGS. 17A to 17E show a method of calculating the size of the character writing frame when the size is changed as shown in FIGS. 14B to 16.

Referring to FIG. 17A, reference characters Cs and Ce represent diagonal coordinates of character writing area 24 as in the case of FIG. 13B. Cg represents the reference coordinate of the character writing frame 241 at the upper left corner. Cw represents the width of the character writing area 24. Ch represents the length of the character writing area 24. Cwg represents the distance from the reference coordinate Cg of character writing frame 241 to the right end of character writing area 24. Chg represents the distance from the reference coordinate Cg of character writing frame 241 to the lower end of character writing area 24.

Figure 17B:
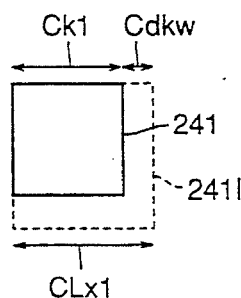
Figure 17C:
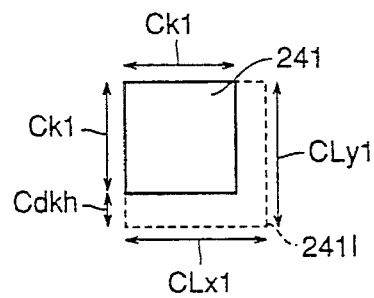

FIGS. 17B and 17C show character writing frames and imaginary frames. In FIGS. 17B and 17C, the reference character Ck1 represents the length of one side of character writing frame 241. Cdkw represents the distance to the laterally adjacent character writing frame. CLx1 (=Ck1+Cdkw) represents the width of the imaginary frame 241I. Referring to FIG. 17C, Cdkh represents the distance to the longitudinally adjacent character writing frame. CLy1 (=Ck1+Cdkh) represents the length of imaginary frame 241I.

Referring to FIGS. 17A to 17C, when the number in the lateral direction of the character writing frames is fixed (in these figures, four), the length CLx1 in the lateral direction of imaginary frame 241I is determined by the integer part of a quotient of (Cwh÷ the number in the lateral direction of the character writing frames). The size Ck1 of the character writing frame is calculated in accordance with (CLx1−Cdkw).

Figure 17D:
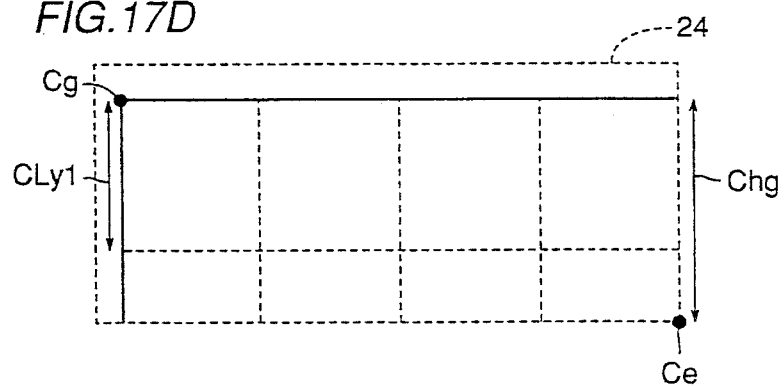

Referring to FIGS. 17C and 17D, the length CLy1 of imaginary frame 241I is calculated in accordance with (Ck1+Cdkh). The number in the lengthwise direction of the character writing frames is determined by the quotient of (Chg÷CLy1).

Figure 17E:
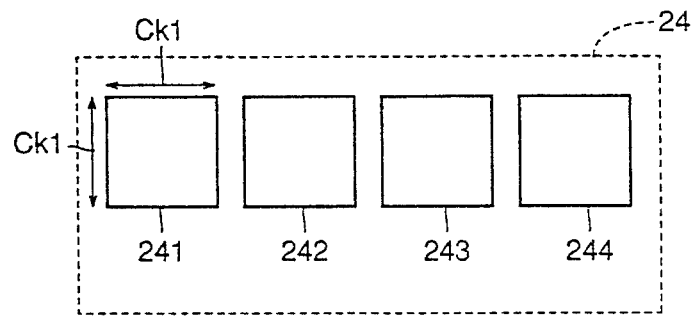

When the size Ck1 and the number in the lengthwise direction of the character writing frames are calculated, the character writing frames are rearranged as shown in FIG. 17E.

As described above, in the first embodiment, when the size of data input frame 22 is changed, the size of the character writing frames 241 to 244 are changed in accordance with the changed size of the frame 22. Therefore, the user can readily change the size of character writing frames 241 to 244 as desired.

An operation of selecting a font for display in character writing frame will be described.

FIG. 18A shows a character writing frame, and Ck represents the length of one side of the character writing frame 241.

FIG. 18B shows a font size managing table representing three different fonts used in the handwritten character input system. CfS, CfM and CfL represents types of fonts. CfSK, CfMK and CfLK represent sizes of the fonts. The font size managing table is restored in frame information managing memory 6B shown in FIG. 1.

Referring to FIG. 14A, when automatic font selection key 34 is pointed in menu 32, a mode in which an optimal font for the character writing frame is automatically selected is set. More specifically, when characters are handwritten in character writing frames 241 to 244, character recognizing portion 13 recognizes the handwritten characters and convert the characters to character codes. When the size Ck of the character writing frame is given, display font control portion 11 refers to the font size managing table shown in FIG. 18B and determines the largest font which can be accommodated in the character writing frame 241 as the optimal font for the character writing frame 241, as shown in FIG. 18C, and the optimal fonts are displayed on character writing frames 241 to 244.

Figure 14B:
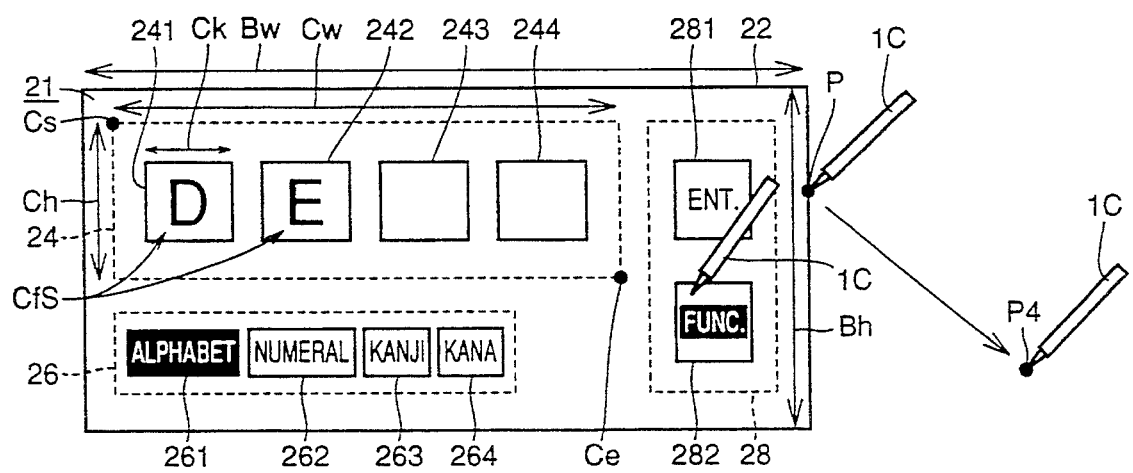
FIG. 14B shows an image displayed on the tablet showing operation of changing the size of the character writing frame when "FRAME SIZE SETTING" is selected and "AUTO" is selected.

In FIG. 14B, smallest fonts CfS are displayed on character writing frames 241 to 242. When the size of character writing frames 241 to 244 is enlarged as shown in FIG. 16, character input control portion 6 supplies the size Ck4 of the enlarged character writing frames 241 to 244 to the display font control portion 11. Display font control portion 11 selects the font which is suitable for the size Ck4. Here, a middle size font CfM is selected and the middle size font CfM is displayed again in place of the small size font CfS.

As described above, in the handwritten character input system, when the size of the character writing frame is changed, the largest font is displayed again in accordance with the changed size and therefore, the font displayed in the character writing frame may be easily confirmed even by a user with weak eye-sight.

As shown in FIG. 14A, in menu 32, if a specific font setting key 37 designating the small size font is pointed, the handwritten character in character writing frame is always displayed in the small size font CfS, and if the size of the character writing frame is changed, the display is given in the small size font CfS.

FIG. 19 is a flow chart showing the operation of the main system control portion 2.

Referring to FIG. 19, in steps S1, main system control portion 2 determines whether or not a character code is supplied from input system control portion 5. Since the character code is not supplied at first, main system control portion 2 reads coordinate data from coordinate input panel 1B in steps S2.

In step S4, main system control portion 2 determines whether the coordinate pointed by pen 1C is within the document area 20 or in input operation area 21. If it is in the input operation area, in step S5, main system control portion 2 supplies the coordinate data to input system control portion 5.

Again, in step S1, main system control portion 2 determines whether or not the character code is supplied from input system control portion 5, and if the character code is supplied, in steps S6, main system control portion 2 supplies the character code to document editing portion 4.

Meanwhile, in step S4, when the coordinate pointed by pen 1C is within the document area 20, in step S7, main system control portion 2 supplies the coordinate data to document editing portion 4.

FIG. 20 is a flow chart showing the operation of input system control portion 5.

Referring to FIG. 20, input system control portion 5 always monitors the coordinate data supplied from main system control portion 2. In step S10, input system control portion 5 receives coordinate data from main system control portion 2, and in step S11 it determines whether or not there is coordinate data.

When there is coordinate data, in step S12, input system control portion 5 checks the coordinate pointed by pen 1C. If the coordinate is within the character writing frame, in step S13, input system control portion 5 display the handwritten character on liquid crystal display panel 1A. Input system control portion 5 starts the timer when pen 1C is pulled up, and resets the timer when pen 1C is put down. When pen 1C is put down in a new character writing frame, input system control portion 5 recognizes the handwritten character in the preceding character writing frame, and displays the recognized character on liquid crystal display panel 1A.

If the coordinate is within data input frame 22, in steps S14, input system control portion 5 changes the size of data input frame 22. More specifically, input system control portion 5 starts changing the size of data input frame 22 when pen 1C is put down, changes the size of data input frame 22 while pen 1C is moved, and displays the changed data input frame 22 on liquid crystal display panel 1A. Input system control portion 5 fixes the size of data input frame 22 when pen 1C is pulled up.

In the size changing mode, input system control portion 5 changes the size of the character writing frame in accordance with the changed size of data input frame 22. In the number changing mode, input system control portion 5 changes the number of character writing frames in accordance with the changed size of data input frame 22. In the font automatic setting mode, input system control portion 5 changes the font to be displayed, in accordance with the changed size of the data input frame.

If the coordinate is in other area, for example, in the menu area 28, in step S15 input system control portion 5 carries out processing based on the function selected in the menu. For example, input system control portion 5 supplies the recognized character to main system control portion 2. Input system control portion 5 selects either the change of the size of the character writing frame or the change of the number of the character writing frames. Input system control portion 5 also designates a font to be displayed. Input system control portion 5 displays and erases the menu on liquid crystal display panel 1A.

Meanwhile, if there is not the coordinate data from main system control portion 2, in steps S16, input system control portion 5 starts operation of the timer, and if the operation of the timer ends in step S17, input system control portion 5 recognizes the handwritten character, erases the handwritten character and display the recognized character, in step S18.

Figure 21:
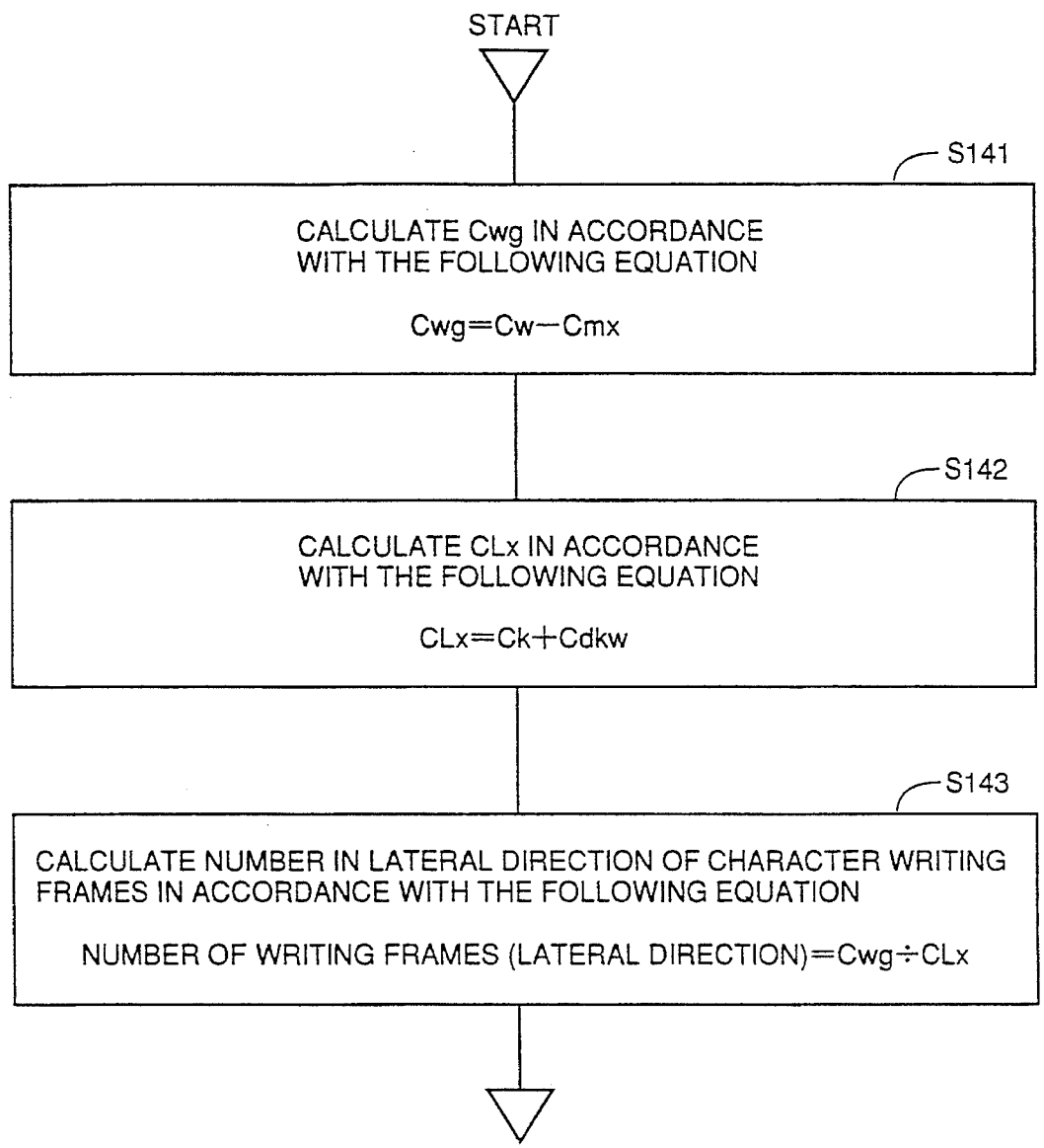
FIG. 21 is a flow chart showing a method of calculating the number of character writing frames in the widthwise direction when the number of character writing frames is changed as shown in FIGS. 6 to 12.

FIG. 21 is a flow chart showing in detail the operation for changing the number in the lateral direction of the character writing frames in step S14 of FIG. 20. When the size of the character writing frame is changed, the number in the lateral direction of the character writing frames is not changed, and therefore the process shown in this flow chart is not carried out.

Referring to FIG. 21 together with FIGS. 14A to 14C, in steps S141, the distance Cwg from the reference coordinate Cg at the upper left corner of character writing frame 241 to the right end of character writing area 24 is calculated. Cwg is calculated in accordance with the expression (Cw−Cmx), where Cw represents the width of character writing area 24, and Cmx represents the distance from the reference coordinate Cg of the character writing frame 241 at the upper left corner to the character writing area 24.

In step S142, the width CLx of the imaginary frame 241I is calculated. CLx is calculated in accordance with the expression (Ck+Cdkw), where Ck represents the length of one side of character writing frame 241, and Cdkw represents the distance to the laterally adjacent character writing frame. In step S143, the number of character writing frames in the lateral direction is calculated. The number is determined by the integer part of the quotient of (Cwg÷CLx).

Figure 22:
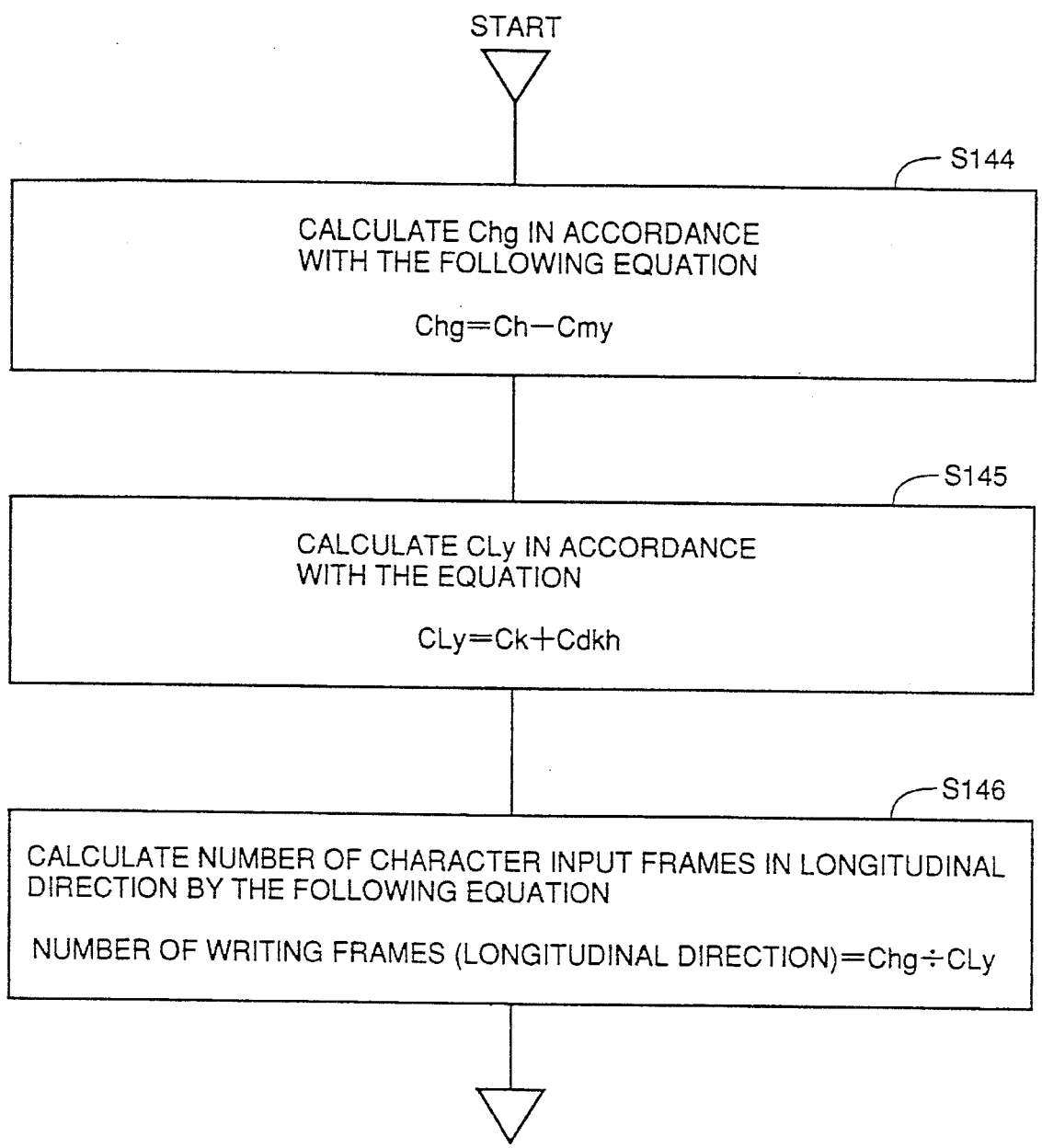
FIG. 22 is a flow chart showing a method of calculating number of the character writing frames in the lengthwise direction when the number is changed as shown in FIGS. 6 to 12.

FIG. 22 is a flow chart showing in further detail the operation for changing the number of the character writing frames in the longitudinal direction in step S14 of FIG. 20. When the size of the character writing frame is changed, the number of the character writing frames in the longitudinal direction is not changed, and therefore the process of the flow chart is not effected.

Referring to FIG. 22 together with FIGS. 13A to 1C, in step S144, the distance Chg from the reference coordinate Cg of the character writing frame 241 positioned at the upper left corner to the lower end of the character writing area 24 is calculated. Chg is calculated in accordance with the expression (Ch−Cmy), where Ch represents the length of the character writing area 24, and Cmy represents the distance from the reference coordinate Cg of the character writing frame 241 at the upper left corner to the upper end of character writing area 24.

In step S145, the length CLy of imaginary frame 241I is calculated in accordance with (Ck+Cdkh), where Cdkh represents the distance to the longitudinally adjacent character writing frame.

In step S146, the number of the character writing frames in the longitudinal direction is calculated. The number is determined by the integer part of the quotient calculated in accordance with (Chg÷CLy).

Figure 23:
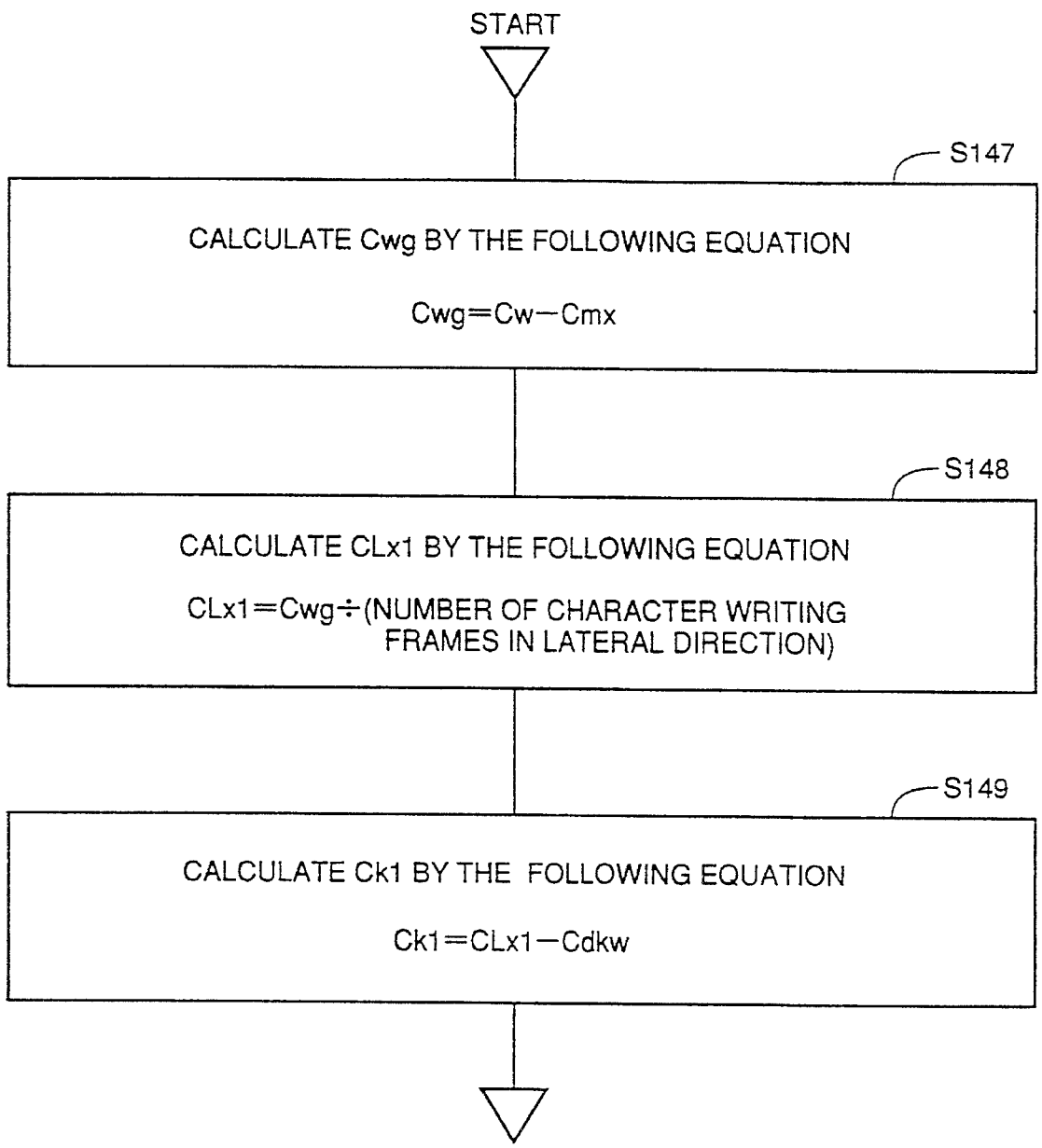
FIG. 23 is a flow charts showing a method of calculating the size of the character writing frame when the size is changed as shown in FIGS. 14B to 16.

FIG. 23 is a flow chart showing in greater detail the operation of changing the size of the character writing frame in step S14 of FIG. 20. When the number of character writing frames is changed, the size of the character writing frame is not changed, and therefore the process shown by this flow chart is not carried out.

Referring to FIG. 23 together with FIGS. 17A to 17E, in step S147, the distance Cwg from the reference coordinate Cg of the character writing frame 241 at the upper left corner to the right end of the character writing area 24 is calculated in accordance with the expression (Cw−Cmx).

In step S148, the width CLx1 of imaginary frame 241I is calculated, in accordance with the expression (Cwg÷the number in the lateral direction of the character writing frames).

In step S149, the length Ck1 of one side of the character writing frame 241 is calculated in accordance with (CLx−Cdkw).

FIGS. 44A and 44B are flow charts showing in greater detail the operation for changing the font in step S14 of FIG. 20. When the number of character writing frames is changed, the size of the character writing frame is not changed and the font is not changed. Therefore, in that case, the process shown by the flow chart is not carried out.

Figure 24:
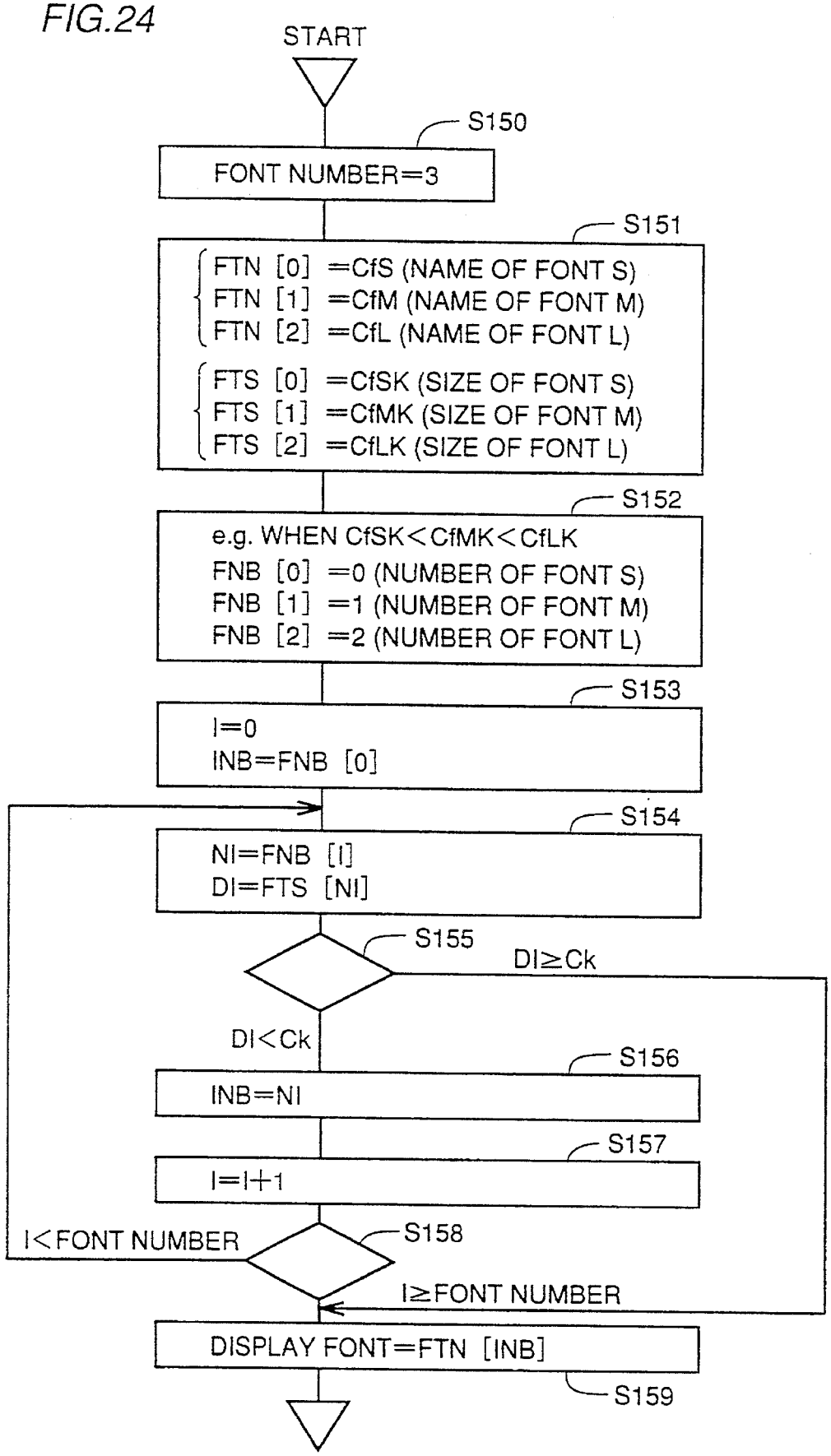
FIG. 24 is flow charts showing a method of changing a display font, when the display font is changed as shown in FIGS. 14 to 16.

Referring to FIG. 24 together with FIGS. 18A to 18C, in step S150, the number of fonts is set. In this example, there are three different fonts of S, M and L, and therefore the number of fonts is 3.

In step S151, names of the fonts are stored in tables FTN indicative of the names of the fonts. Here, CfS is stored in FTN [0], CfM is stored in FTN [1] and CfL is stored in FTN [2].

In tables FTS, the sizes of the fonts are stored. Here, CfSK is stored in FTS [0], CfMK is stored in FTS [1], and CfLK is stored in FTS [2].

In step S152, in table FNB, font numbers are stored in the order of the font sizes, starting from smaller ones. For example, if the font S is the smallest, the font M is the second smallest and the font L is the largest, the number "0" of the font S is stored in FNB [0], "1" which is the number of the font M is stored in FNB [1] and "2", which is the number of the font L is stored in FNB [2].

In step S153, the variable I is set to 0, and the table FNB [0] is stored in variable INB. In step S154, the table FNB [I] is stored in variable NI, and the table FTS [NI] is stored in variable DI. In step S155, if the variable DI is smaller than the size Ck of the character writing frame, then, in step S156, the variable NI is stored in variable INB. In step S157, the variable I is incremented.

In step S158, if the variable I is smaller than the font number, the operation of step S154 is carried out again. If the variable I is not larger than the font number, the font specified by the table FTN [INB] is displayed in step S159.

In step S155, if the variable DI is not smaller than the size Ck of the character writing frame, the font specified by the table FTN [INB] is displayed in step S159.

As described above, in the handwritten character input system in accordance with the first embodiment, when the user changes the size of data input frame 22, the number or the size of the character writing frame is automatically changed in accordance with the changed size of the data input frame, and therefore, the user can readily change the number or the size of the character writing frame as desired. Since the size of the data input frame can be arbitrarily changed, other display may not be overlapped or hindered by the data input frame on the screen.

Further, when the size of the character writing frame is changed, the font to be displayed on the character writing frame is automatically changed to the largest one, and therefore the user can easily confirm the recognized character.

EMBODIMENT 2

Figure 25:
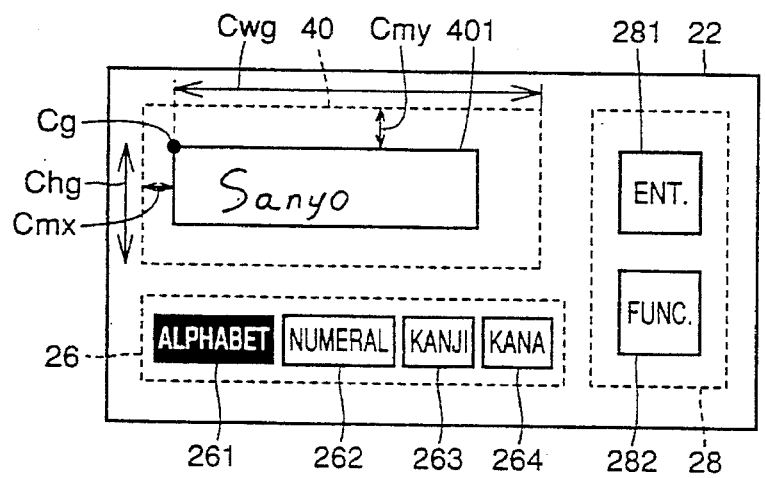
FIG. 25 shows an image displayed on the tablet in the handwritten character input system in accordance with the second embodiment of the present invention.

FIG. 25 shows a displayed image on liquid crystal display panel 1A in the handwritten character input system in accordance with a second embodiment of the present invention.

Referring to FIG. 25, data input frame 22 includes a character writing area 40, a character type selecting area 26 and a menu area 28. Character writing area 40 includes one character writing frame 401. In this character writing frame 401, a plurality of handwritten characters are input. More specifically, unlike the first embodiment in which character writing frames 241 to 258 each define an area in which one handwritten character can be input, the character writing frame 401 of the second embodiment define an area in which a plurality of handwritten characters can be input.

Figure 26:
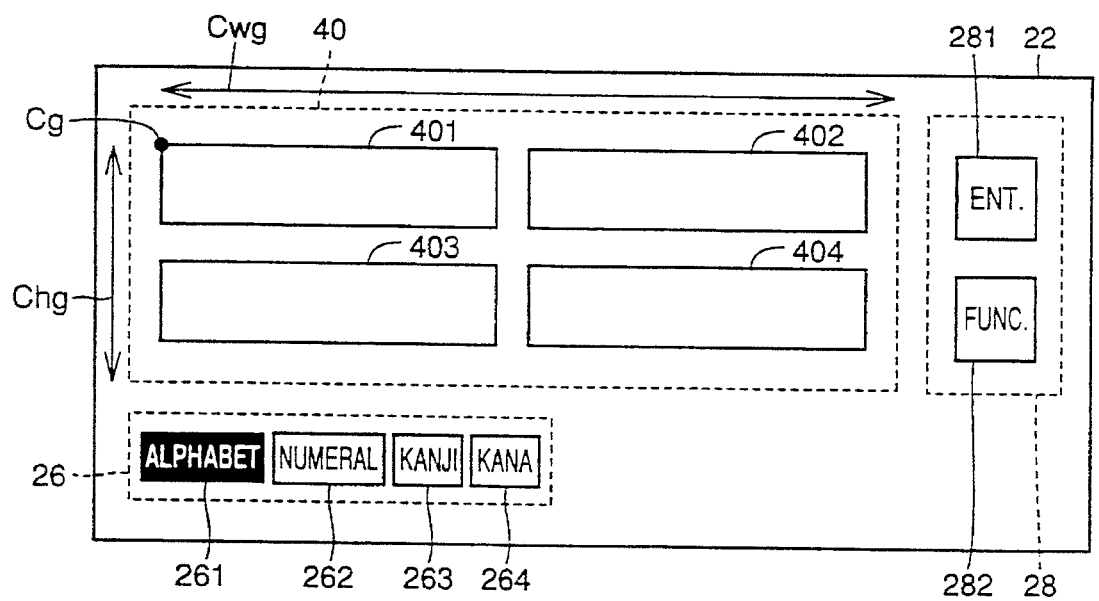
FIG. 26 shows a displayed image when the number of character writing frames on the display screen shown in FIG. 25 is changed.

FIG. 26 shows a displayed image when the data input frame 22 is enlarged, in the frame number changing mode.

As shown in FIG. 26, if the width and length of data input frame 22 are both enlarged, the size of the character writing area 40 is enlarged in accordance with the enlarged size of the data input frame 22. Further, in accordance with the enlarged size of the character writing area 40, the number of character writing frames 401 to 404 is increased. Here, the number of character writing frames 401 to 404 has been increased from 1 to 4.

When the size of data input frame 22 is enlarged, menu area 28 is rearranged in accordance with the enlarged size. The position of character writing selecting area 26 is not changed.

Figure 27:
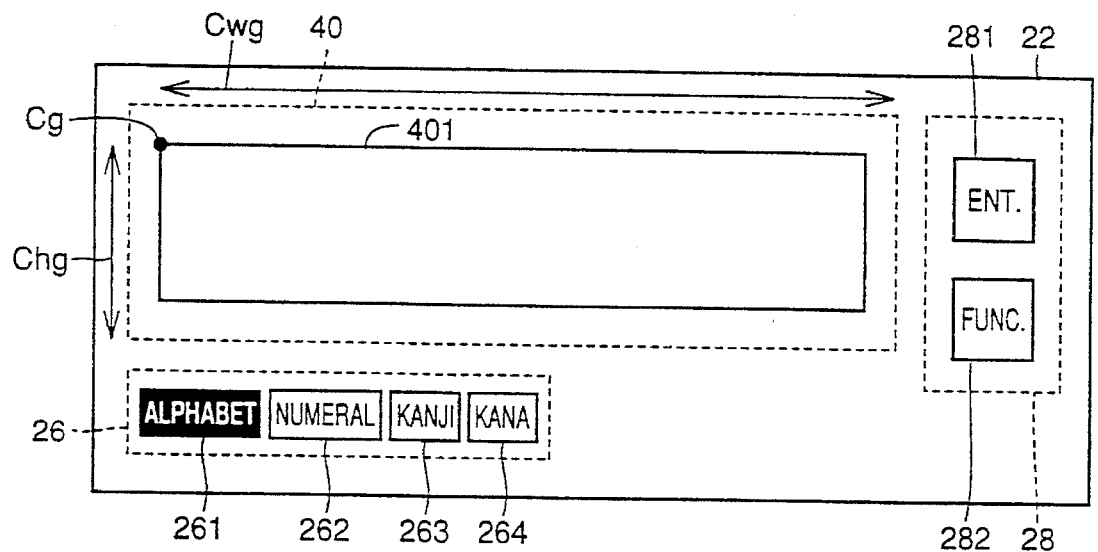
FIG. 27 shows a displayed image when the size of the character writing frame on the display screen shown in FIG. 25 is changed.

FIG. 27 shows a displayed image when the data input frame 22 is enlarged in the frame size changing mode.

Referring to FIG. 27, when the width and length of data input frame 22 are both enlarged, the size of the character writing area 40 is enlarged. Further, in accordance with the enlarged size of the character writing area 40, the size of character writing frame 401 is enlarged. In addition, when the size of data input frame 22 is enlarged, menu area 28 is rearranged. The position of character type selecting area 26 is not changed.

Figure 28:
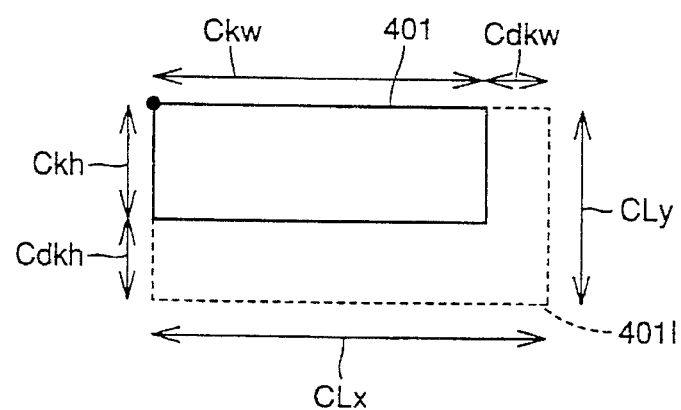
FIG. 28 shows a character writing frame and its imaginary frame on the display screen shown in FIGS. 25 to 27.

FIG. 28 shows the character writing frame shown in FIGS. 25 to 27 and an imaginary frame corresponding thereto.

Referring to FIG. 28, the reference character Ckw represents the width of character writing frame 401. Ckh represents the length of character writing frame 401. Cdkw represents the distance to the laterally adjacent character writing frame. Cdkh represents the distance to the longitudinally adjacent character writing frame. CLx (=Ckw+Cdkw) represents the width of the imaginary frame 401I. CLy (=Ckh+Cdkh) represents the length of the imaginary frame 401I.

Figure 29:
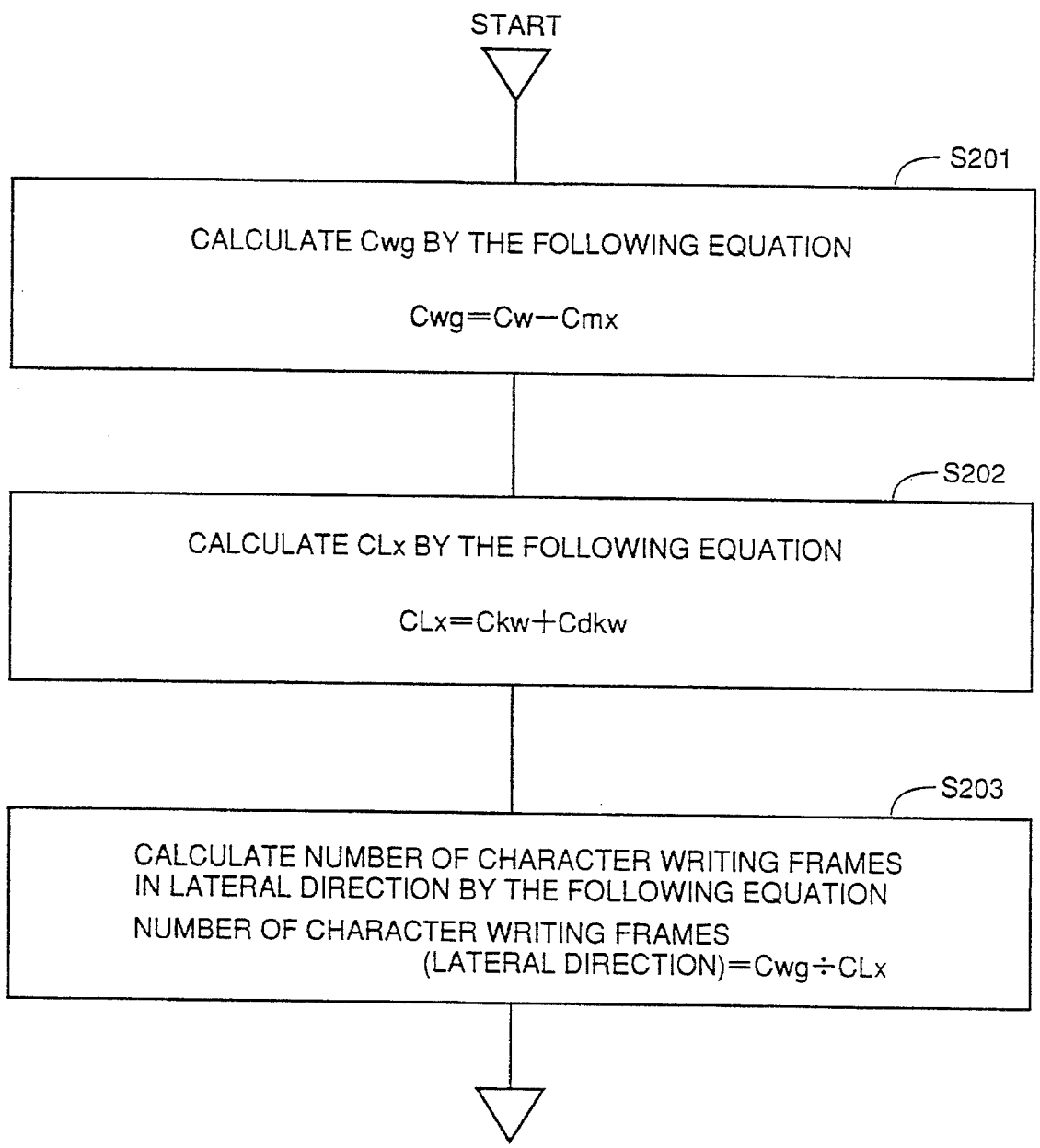
FIG. 29 is a flow chart showing a method of calculating the number of character writing frames in the widthwise direction when the number of character writing frames is changed as shown in FIG. 26.

FIG. 29 is a flow chart showing an operation for changing the number in the lateral direction of the character writing frames in the second embodiment. When the size of the character writing frame is to be changed, the number in the lateral direction of the character writing frames is not changed, and therefore, the process shown in the flow chart is not carried out.

Referring to FIG. 29 together with FIGS. 25 and 26, in step S201, the distance Cwg from the reference coordinate Cg of the character writing frame 401 at the upper left corner to the right end of the character writing area 40 is calculated in accordance with the expression (Cw−Cmx). Cmx represents the distance from the reference coordinate Cg of the character writing frame 401 to the left end of the character writing area 40.

In step S202, the width CLx of the imaginary frame 401I shown in FIG. 28 is calculated in accordance with the expression (Ckw+Cdkw), where Ckw represents the width of the character writing frame and Cdkw represents the distance to the laterally adjacent character writing frame.

In step S203, the number of the character writing frames 401 to 404 in the lateral direction is calculated. The number in the lateral direction of the character writing frames 401 to 404 is determined by an integer part of the quotient obtained by (Cwg÷CLx).

Figure 30:
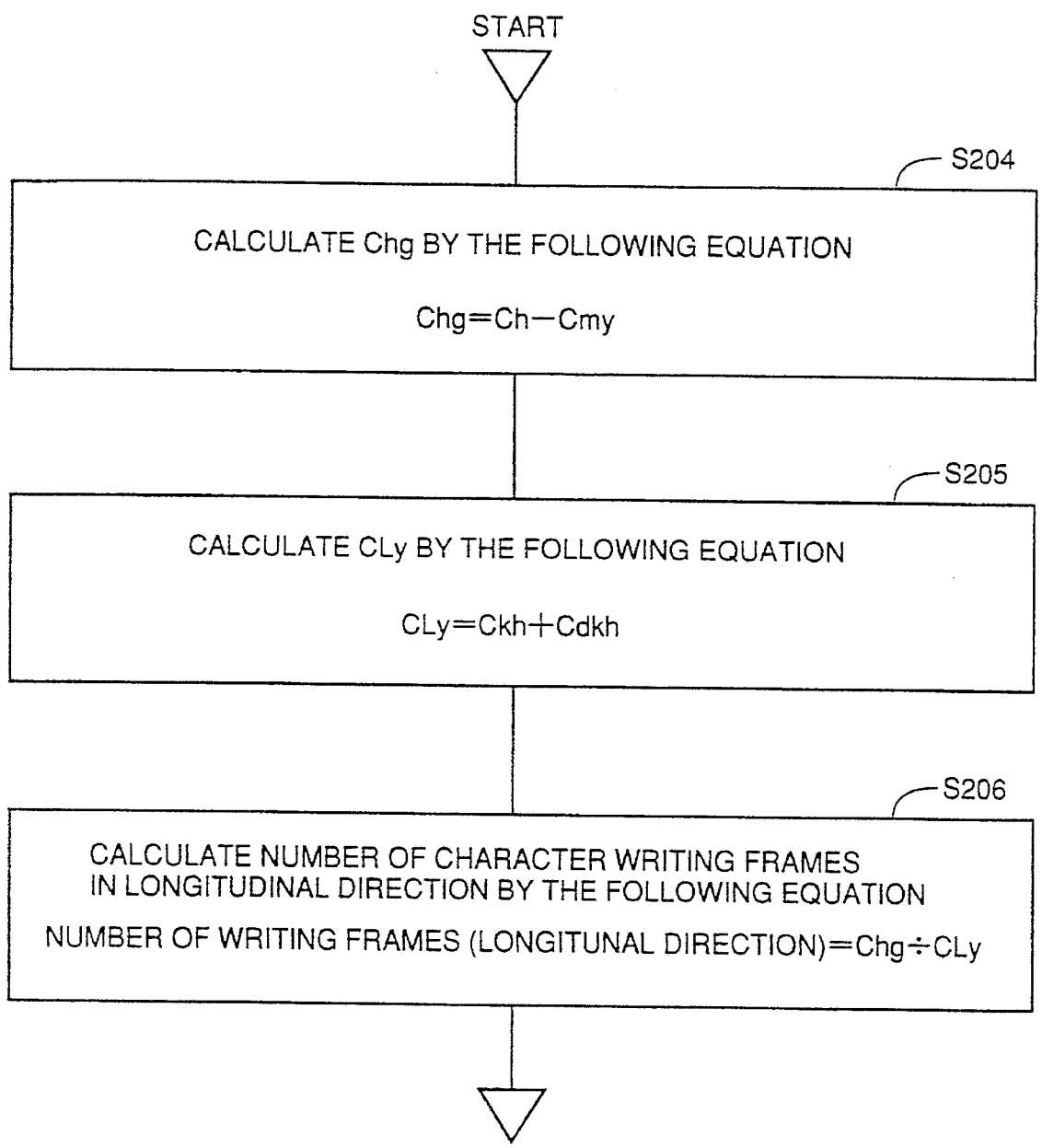
FIG. 30 is a flow chart showing a method of calculating the number of character writing frames in the lengthwise direction, when the number is changed as shown in FIG. 26.

FIG. 30 is a flow chart showing the operation for changing the number of the character writing frames in the longitudinal direction. When the size of the character writing frame is changed, the number of the character writing frames in the longitudinal direction is not changed, and therefore the process of the flow chart is not carried out.

Referring to FIG. 30 together with FIGS. 25 and 26, in step S204, the distance Chg from the reference coordinate Cg of the character writing frame 401 positioned at the upper left corner to the lower end of character writing area 40 is calculated in accordance with the equation (Ch−Cmy), where Ch represents the length of character writing area 40 and Cmy represents the distance from the reference coordinate Cg of character writing frame 401 to the upper end of character writing area 40.

In step S205, the length CLy of the imaginary frame shown in FIG. 28 is calculated in accordance with (Ckh+Cdkh). Ckh represents the length of character writing frame 401 and Cdkh represents the distance to the longitudinally adjacent character writing frame.

In step S206, the number of character writing frames 401 to 404 in the longitudinal direction is calculated. The number of character writing frames 401 to 404 in the longitudinal direction is determined by the integer part of the quotient obtained by (Chg÷CLy).

Figure 31:
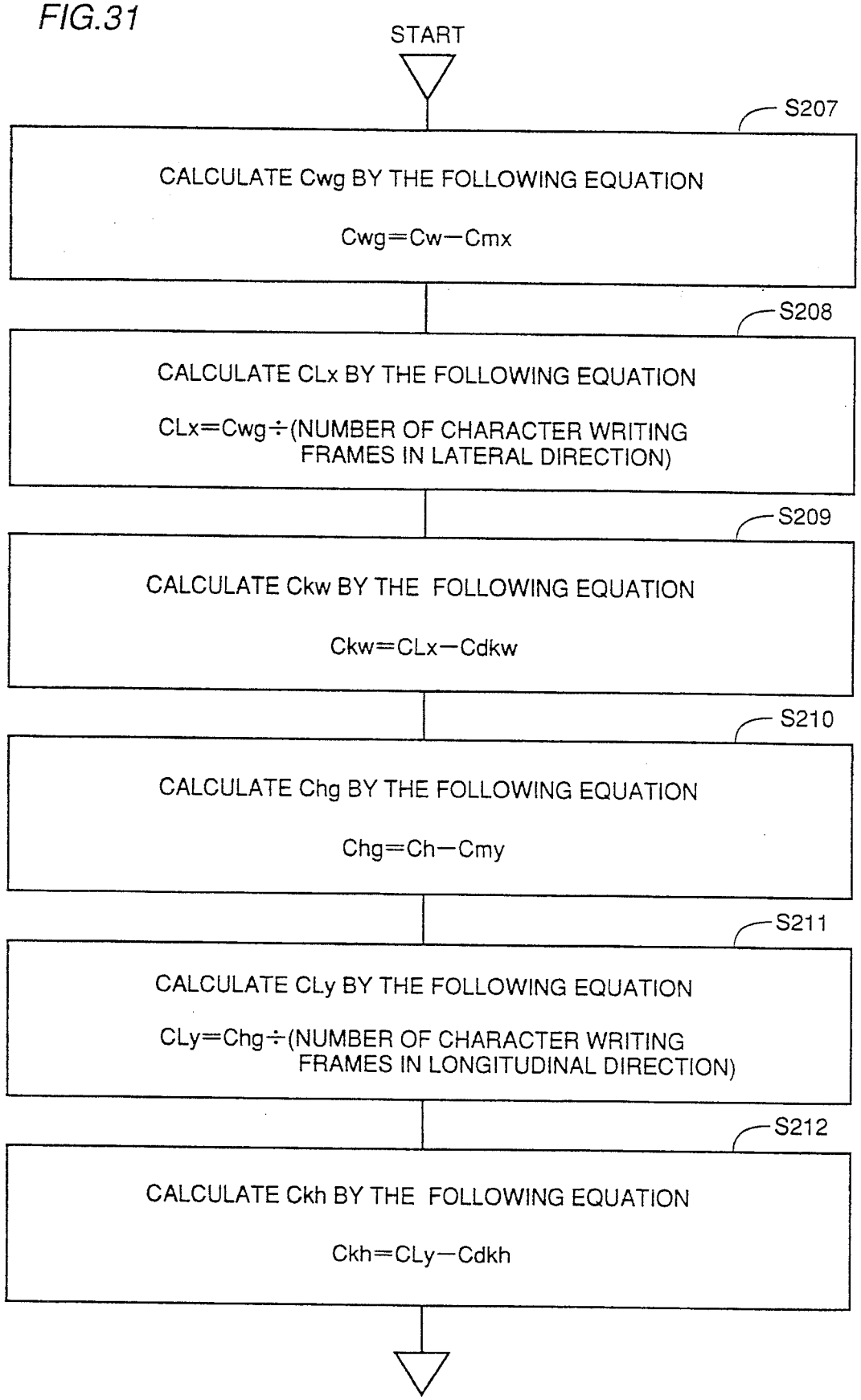
FIG. 31 is flow charts showing the method of calculating the size of the character writing frame when the size is changed as shown in FIG. 27.

FIGS. 31 is flow charts showing the operation for changing the size of the character writing frame. When the number of character writing frames is changed, the size of the character writing frame is not changed, and therefore the process of the flow chart is not carried out.

Referring to FIG. 31 together with FIGS. 25 and 27, in step S207, the distance Cwg from the reference coordinate Cg of the character writing frame 401 at the upper left corner to the right end of character writing area 40 is calculated by (Cw−Cmx), where Cw represents the width of character writing area 40 and Cmx represents the distance from the reference coordinate Cg of character writing frame 401 to the left end of character writing area 40.

In step S208, the width CLx of the imaginary frame 401I shown in FIG. 28 is calculated by (Cwg÷the number of the character writing frames in the lateral direction).

In step S209, the width Ckw of the character writing frame is calculated by (CLx−Cdkw) where Cdkw represents the distance to the laterally adjacent character writing frame.

In step S210, the distance Chg from the reference coordinate Cg of character writing frame 401 at the upper left corner to the lower end of character writing area 40 is calculated. Chg is calculated by (Ch−Cmy), where Ch represents the length of character writing area 40 and Cmy represents the distance from the reference coordinate Cg of character writing frame 401 to the upper end of character writing area 40.

In step S211, the length CLy of imaginary frame 401I shown in FIG. 28 is calculated by (Chg÷the number of character writing frames in the longitudinal direction).

In step S212, the length Cky of the character writing frame shown in FIG. 28 is calculated by (CLy−Cdkh), where Cdkh represents the distance to the longitudinally adjacent character writing frame.

As is apparent from the second embodiment, the character writing frame is not limited to one which defines an area allowing input of one handwritten character. The character writing frame may define an area in which a plurality of handwritten characters can be input. In other words, the character writing frame defines an area in which at least one handwritten character can be input.

EMBODIMENT 3

Figure 32:
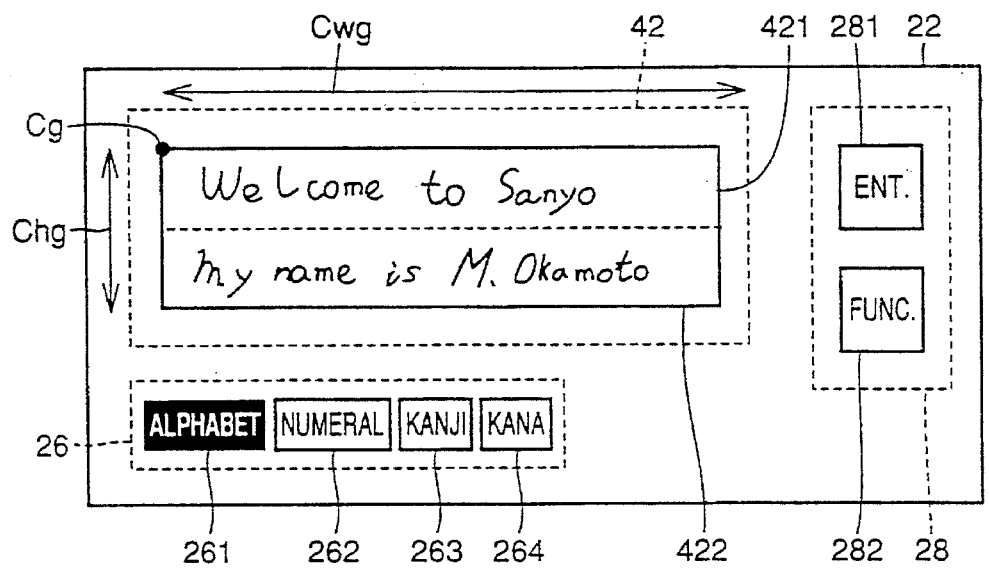
FIG. 32 shows an image displayed on the tablet in the handwritten character input system in accordance with a third embodiment of the present invention.

FIG. 32 shows a displayed image on a liquid crystal display panel in accordance with the handwritten character input system in accordance with the third embodiment of the present invention.

Referring to FIG. 32, data input frame 22 includes a character writing area 24, character type selecting area 26 and menu area 28. Character writing area 42 includes two stages of character writing frames 421 and 422. Character writing frames 421 and 422 each define an area in which a plurality of handwritten characters can be input.

Figure 33:
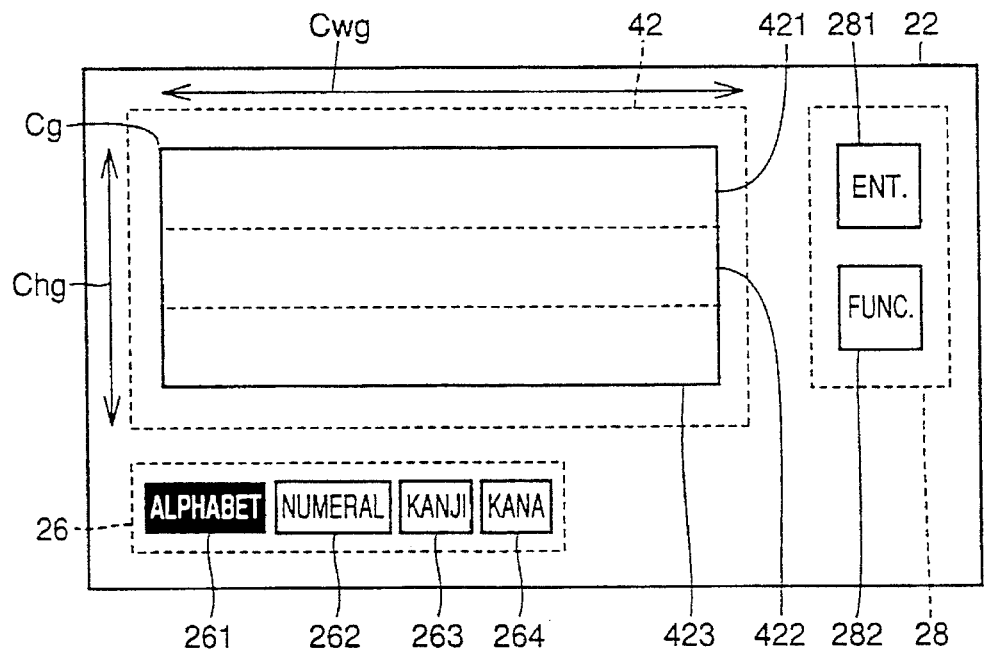
FIG. 33 shows a displayed image when the number of stages of the character writing frames on the display screen shown in FIG. 32 is changed.

FIG. 33 shows a displayed image when the size of the data input frame 22 is enlarged in a stage number changing mode.

Referring to FIG. 33, when the size of data input frame 22 is enlarged in the stage number changing mode, the size of character writing area 42 is enlarged in accordance with the enlarged size of the data input frame. Menu area 28 is rearranged in accordance with the enlarged size, while the position of character type selecting area 26 is not changed. When the size of character writing area 42 is enlarged, the number of stages of character writing frames 421 to 423 is increased in accordance with the enlarged size.

Figure 34:
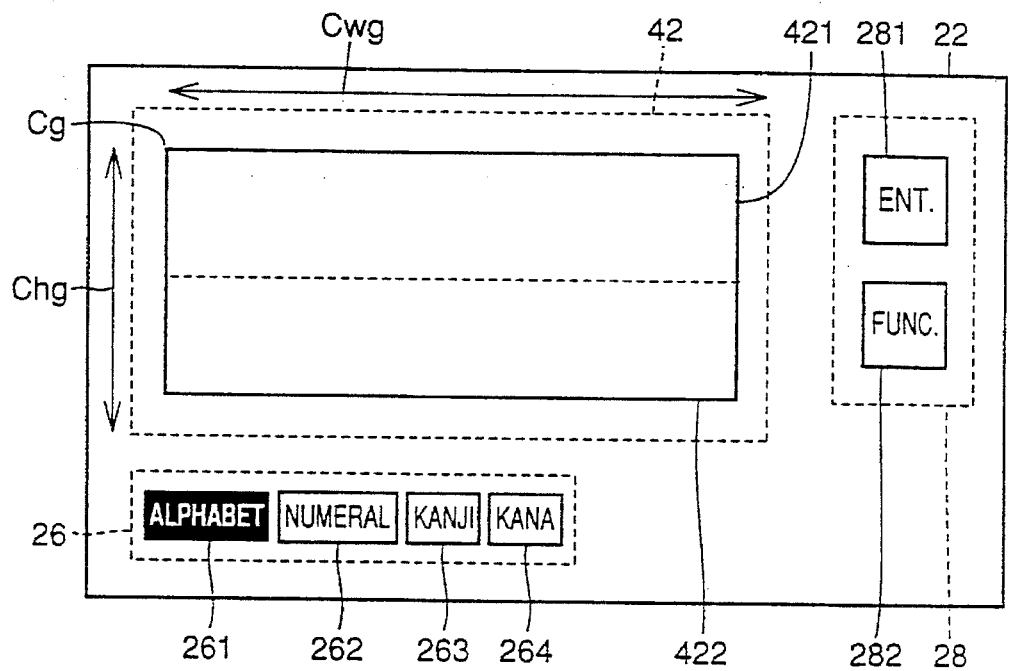
FIG. 34 shows a displayed image when the size of the stage of the character frames on the display screen shown in FIG. 32 is changed.

FIG. 34 shows a displayed image when the data input frame is enlarged in stage size changing mode.

Referring to FIG. 34, when the size of data input frame 22 is enlarged, the size of character writing frame 42 is also enlarged in accordance with the enlarged size of the data input frame. Further, menu area 28 is rearranged in accordance with the enlarged size of data input frame 22. The position of character type selecting area 26 is not changed. When the size of character writing area 42 is enlarged, the length (stage size) of character writing frames 421 and 422 are increased in accordance with the enlarged size.

Figure 35:
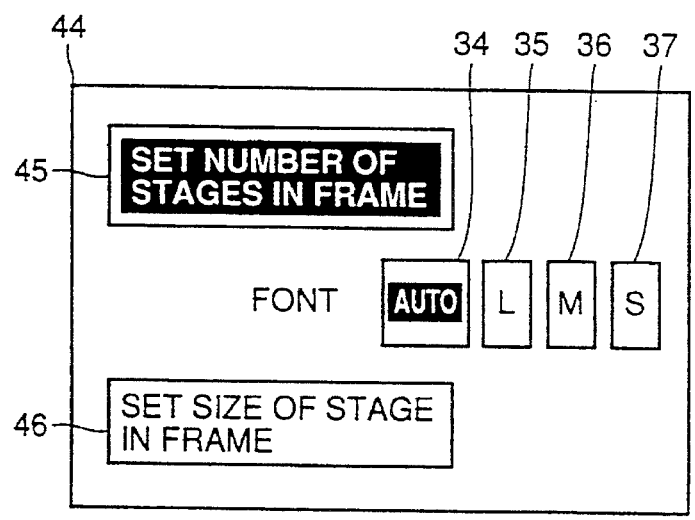
FIG. 35 shows a display of a menu for selecting a stage number changing mode shown in FIG. 33 or a stage size changing mode shown in FIG. 34.

FIG. 35 shows a menu for switching between stage number changing mode and stage size changing mode.

Referring to FIG. 35, in menu 44, there are displayed a key 45 for setting the number of stages in the frame, a key 46 for setting the size of the stage in the frame, an automatic font selection key 34, and specific font setting keys 35 to 37.

When pen 1C is put down on key 45 for setting the number of stages in the frame, the key 45 for setting the number of stages in the frame is highlighted and the stage number changing mode is set. Meanwhile, when pen 1C is put down on key 46 for setting the size of the stage in the frame, the key 46 is highlighted and the stage size changing mode is set.

Figure 36:
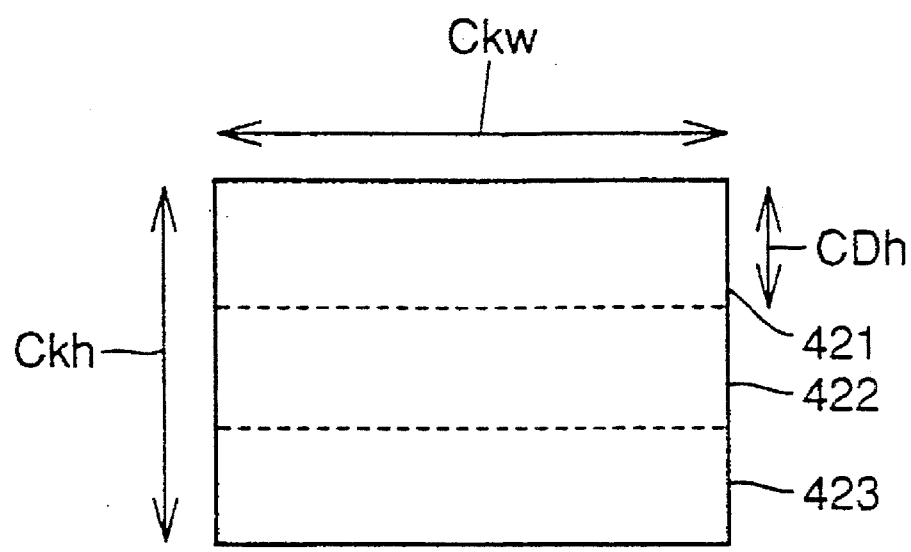
FIG. 36 shows three stages of character writing frames on the display screen shown in FIG. 33.

FIG. 36 shows a character writing frame in accordance with the third embodiment. Referring to FIG. 36, the reference character Ckw represents the width of each of character writing frames 421 to 423. CDh represents the length (stage size) of each of character writing frames 421 to 423. Ckh represents the length of the frame constituted by a plurality of stages of character writing frames 421 to 423.

Figure 37:
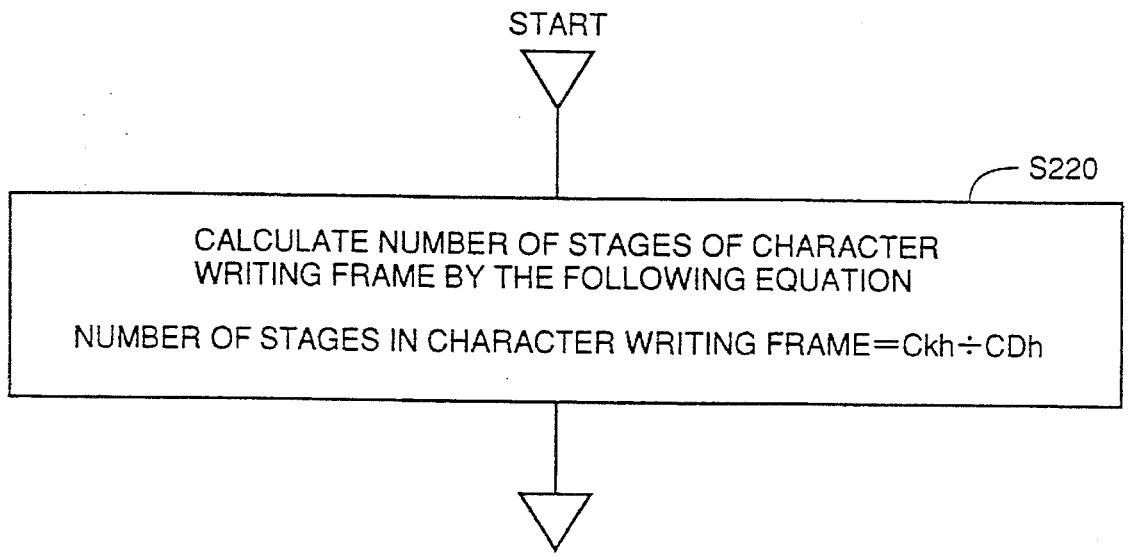
FIG. 37 is a flow chart showing the method of calculating the number of stages, when the number of stages of the character writing frames is changed as shown in FIG. 33.

FIG. 37 is a flow chart showing an operation for changing the number of stages of the character writing frames.

Referring to FIG. 37 together with FIG. 33, in step S220, the number of stages of character writing frames 421 to 423 is calculated. The number of stages of character writing frames 421 to 423 is determined by an integer part of the quotient obtained by (Ckh÷CDh).

Figure 38:
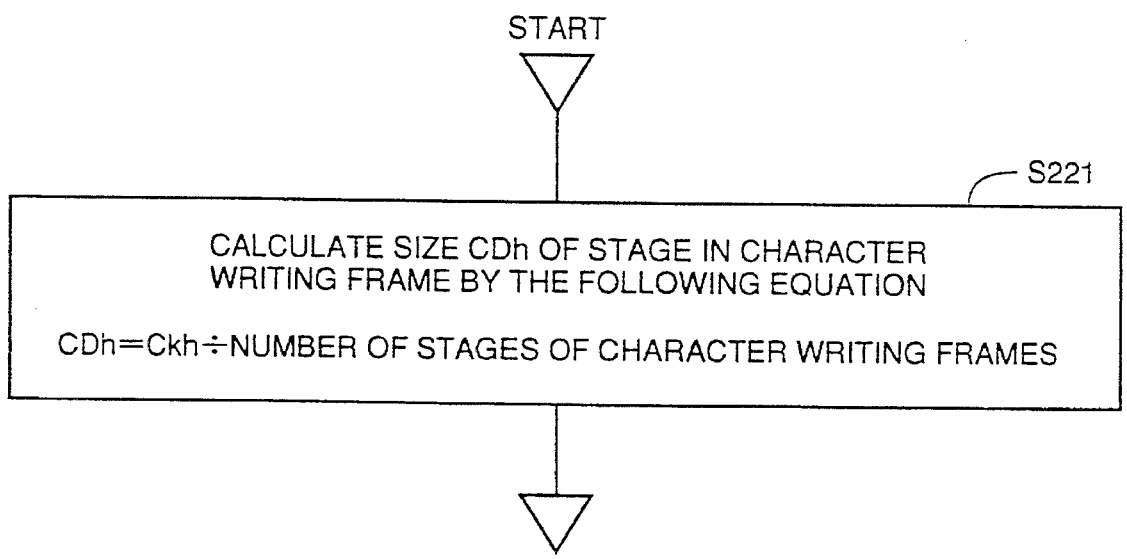
FIG. 38 is a flow chart showing a method of calculating the stage size when the stage size of the character writing frames is changed as shown in FIG. 34.

FIG. 38 is a flow chart showing the operation for changing the stage size of the character writing frames.

Referring to FIG. 38 as well as FIG. 34, in step S221, the stage size CDh of character writing frames 421 and 422 is calculated by (Ckh÷the number of stages of character writing frames).

As is apparent from the third embodiment, data input frame 22 may include a plurality of stages of character writing frames.

OTHER EMBODIMENTS

In the first to third embodiments described above, data input frame 22 includes character type selecting area 26 and menu area 28. However, these areas 26 and 28 may not be included. More specifically, character writing area 24 may be the same as input operation area 21. Though the largest font is selected to be displayed in accordance with the size of the character writing frame in the above described first to third embodiments, the type face of the font (such as block, italics and gothic) may be selected in accordance with the size of the character writing frame.

Though main system control portion 2 feeds character code to document editing portion 4 only in the first to third embodiments, the code may be supplied to other portions. A predetermined number of character writing frames or a character writing frame of a predetermined size may be displayed on the liquid crystal display panel when the handwritten character input system in accordance with the first to third embodiments are turned on.

The handwritten character input system in accordance with the present invention may be implemented by hardware or software. For example, main system control portion 2 of FIG. 1 may be implemented by an operation system and a window system, document editing portion 4 may be implemented by an application program and input system control portion 5 may be implement by a front end processor (FEP).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hand written character input system, comprising:

input means for inputting handwritten characters;

display means for displaying in said input means, one or more character writing frames each defining an area in which at least one of said handwritten characters can be input, and a data input frame including said one or more character writing frames;

first changing means for changing size of said data input frame;

second changing a means for changing number of said character writing frames in response to the size of said data input frame changed by said first changing means;

third changing means for changing size of said character writing frames in response to the size of said data input frame changed by said first changing means; and mode selecting means for selecting change of the number of said character writing frames by said second changing means, or change of the size of said character writing frames by said third changing means.

2. The system according to claim 1, further comprising:

recognizing means for recognizing said handwritten character input in said character writing frame for converting it to a character code; and font selecting means for selecting one character font out of a plurality of character fonts in response to the size of said character writing frame when said handwritten character is input; wherein said display means further displays a print specified by said character font selected by said font selecting means and by said character code recognized by said recognizing means.

3. The system according to claim 2, wherein said font selecting means further selects again one character font out of said plurality of character fonts in response to the size of said character writing frame changed by said third changing means.

4. The system according to claim 1, wherein said data input frame further includes an arbitrary information to be displayed on an area other than the area of said character writing frame;

said system further comprising rearranging means for rearranging said arbitrary information with its size unchanged, in response to the size of said data input frame changed by said first changing means.

5. The system according to claim 1, wherein said first changing means further includes means for changing the size of said data input frame by designating an original coordinate on said data input frame having its original size before changed and by designating a new coordinate corresponding to said original coordinate on said data input frame having its new size changed.

\* \* \* \* \*